US006467943B1

(12) United States Patent
Maguire

(10) Patent No.: US 6,467,943 B1
(45) Date of Patent: Oct. 22, 2002

(54) REDUCED SIZE GRAVIMETRIC BLENDER

(76) Inventor: Stephen B. Maguire, 1549 E. Street Rd., Glen Mills, PA (US) 19342

(*) Notice: Subject to any disclaimer, the term of this patent is extended or adjusted under 35 U.S.C. 154(b) by 0 days.

(21) Appl. No.: 09/076,498

(22) Filed: May 4, 1998

Related U.S. Application Data

(60) Provisional application No. 60/045,343, filed on May 2, 1997.

(51) Int. Cl.[7] ................................................ B01F 15/00

(52) U.S. Cl. ...................... 366/141; 366/151.1; 141/83; 177/59; 222/58

(58) Field of Search ............................... 222/55–58, 77; 177/59, 45, 50, 70; 366/141, 143.1, 151.1, 151.2, 152.1, 152.2, 165.1; 141/83; 406/32, 33; 425/135, 148

(56) References Cited

U.S. PATENT DOCUMENTS

| | | |
|---|---|---|
| 2,161,190 A | 6/1939 | Paull |
| 2,893,602 A | 7/1959 | Barber et al. |
| 3,111,115 A | 11/1963 | Best |
| 3,115,276 A | 12/1963 | Johanningmeier |
| 3,209,898 A | 10/1965 | Bebbe et al. |

(List continued on next page.)

FOREIGN PATENT DOCUMENTS

| | | |
|---|---|---|
| CA | 1100402 | 5/1981 |
| DE | 1 255 582 | 11/1967 |
| DE | 1 982 969 | 4/1968 |
| DE | 2034837 | 4/1972 |
| DE | 32 37 353 | 4/1984 |

(List continued on next page.)

OTHER PUBLICATIONS

Forty–four page two–sided brochure including cover and back pages entitled "Maguire: Auxiliary equipment for the plastics industry" of Maguire Products, Inc., Oct. 2000.

Two–sided color brochure entitled Maguire: WSB–MB Micro–Blender of Maguire Products, Inc., Jun. 1997.

Three page, two–sided color brochure entitled Maguire: Blender Selection Guide, Jun. 1997.

Sheet of 2 photographs of Mould–Tek gravimetric blender, circa 1993.

Sheet of 2 photographs of Motan gravimetric blender and feeding system with Maguire Products, Inc. controls, circa 1993.

Sheet of 3 photographs of UNA–DYN gravimetric blender, circa 1993.

(List continued on next page.)

*Primary Examiner*—Joseph W. Drodge
(74) *Attorney, Agent, or Firm*—Charles N. Quinn

(57) ABSTRACT

A gravimetric blender of a reduced size mounted to be directly over the feed trough of small molding machines or extruders. The blender has an upright hollow rectangular frame with a transparent panel. The top of the frame forms a cradle for removably supporting a plurality of hoppers having a bottom discharge controlled by a valve mechanism. The valve mechanism is mounted on each hopper and is connected to a control station having a quick-disconnect fitting on the hopper. The hoppers discharge sequentially into a weigh bin supported on a load cell connected to the control station of the blender. The weigh bin has an openable bottom portion pivotally mounted thereon for actuation by the control station when the appropriate weight is registered by the load cell. The weigh bin discharges into a mixing chamber having an agitator or mixer removably mounted therein. The mixer is journaled for rotation in the transparent panel which is removable so that when the panel is removed, the mixer agitator is disengaged from its drive and removed with the panel.

51 Claims, 15 Drawing Sheets

108
116
110
118
112
121

U.S. PATENT DOCUMENTS

| | | | | |
|---|---|---|---|---|
| 3,228,563 A | | 1/1966 | Rankin et al. | |
| 3,252,531 A | | 5/1966 | Mayer et al. | |
| 3,348,848 A | | 10/1967 | Lucking et al. | |
| 3,410,530 A | | 11/1968 | Gilman | |
| 3,470,994 A | | 10/1969 | Schnell et al. | |
| 3,814,388 A | | 6/1974 | Jakob | |
| 3,822,866 A | | 7/1974 | Daester et al. | |
| 3,853,190 A | | 12/1974 | Delesdernier | |
| 3,871,629 A | | 3/1975 | Hishida | |
| 3,959,636 A | | 5/1976 | Johnson et al. | |
| 3,967,815 A | | 7/1976 | Backus et al. | |
| 3,985,262 A | | 10/1976 | Nauta | |
| 4,014,462 A | | 3/1977 | Robertson | |
| 4,026,442 A | | 5/1977 | Orton | |
| 4,108,334 A | | 8/1978 | Moller | |
| 4,148,100 A | | 4/1979 | Moller | |
| 4,219,136 A | | 8/1980 | Williams et al. | |
| 4,339,277 A | | 7/1982 | Schult | |
| 4,354,622 A | | 10/1982 | Wood | |
| 4,364,666 A | | 12/1982 | Keyes | 366/142 |
| 4,402,436 A | | 9/1983 | Hellgren | |
| 4,454,943 A | | 6/1984 | Moller | |
| 4,459,028 A | * | 7/1984 | Bruder et al. | 366/141 |
| 4,475,672 A | | 10/1984 | Whitehead | |
| 4,498,783 A | | 2/1985 | Rudolph | |
| 4,525,071 A | | 6/1985 | Horowitz et al. | |
| 4,544,279 A | | 10/1985 | Rudolph | |
| 4,552,235 A | | 11/1985 | Brunnschweiler | |
| 4,581,704 A | | 4/1986 | Mitsukawa | |
| 4,629,410 A | | 12/1986 | Hehl | 425/578 |
| 4,705,083 A | | 11/1987 | Rossetti | |
| 4,733,971 A | | 3/1988 | Pratt | |
| 4,756,348 A | | 7/1988 | Moller | |
| 4,793,711 A | | 12/1988 | Ohlson | |
| 4,812,048 A | | 3/1989 | Neumann et al. | 366/141 |
| 4,830,508 A | | 5/1989 | Higuchi et al. | |
| 4,848,534 A | | 7/1989 | Sandwall | |
| 4,850,703 A | | 7/1989 | Hanaoka et al. | |
| 4,895,450 A | | 1/1990 | Holik | 366/141 |
| 5,096,302 A | | 3/1992 | Durina | |
| 5,110,521 A | | 5/1992 | Moller | |
| 5,116,547 A | | 5/1992 | Tsukahara et al. | |
| 5,125,535 A | | 6/1992 | Ohlman | |
| 5,132,897 A | | 7/1992 | Allenberg | |
| 5,143,166 A | | 9/1992 | Hough | 177/128 |
| 5,148,943 A | | 9/1992 | Moller | |
| 5,172,489 A | | 12/1992 | Moller | |
| 5,213,724 A | | 5/1993 | Saatkamp | 425/148 |
| 5,217,108 A | | 6/1993 | Newnan | |
| 5,225,210 A | | 7/1993 | Shimoda | |
| 5,240,324 A | | 8/1993 | Phillips et al. | 366/132 |
| 5,252,008 A | | 10/1993 | May, III et al. | 406/23 |
| 5,261,743 A | | 11/1993 | Moller | |
| 5,282,548 A | | 2/1994 | Ishihara | |
| 5,285,930 A | | 2/1994 | Nielsen | |
| 5,340,949 A | | 8/1994 | Fujimura et al. | |
| 5,341,961 A | | 8/1994 | Hausam | 222/317 |
| 5,423,455 A | | 6/1995 | Ricciardi et al. | |
| 5,527,107 A | * | 6/1996 | Weibel et al. | 366/141 |
| 5,599,099 A | | 2/1997 | Bullivant | 366/141 |
| 5,599,101 A | * | 2/1997 | Pardikes | |
| 5,651,401 A | | 7/1997 | Cados | |
| 5,767,453 A | | 6/1998 | Wakou et al. | |
| 5,767,455 A | | 6/1998 | Mosher | 177/64 |
| 5,772,319 A | | 6/1998 | Pemberton et al. | 366/76.2 |
| 5,780,779 A | | 7/1998 | Kitamura et al. | |
| 5,843,513 A | | 12/1998 | Wilke et al. | |
| 6,007,236 A | | 12/1999 | Maguire | |
| 6,057,514 A | | 5/2000 | Maguire | |
| 6,155,709 A | * | 12/2000 | O'Callaghan | 366/141 |
| 6,188,936 B1 | * | 2/2001 | Maguire | 366/141 |

FOREIGN PATENT DOCUMENTS

| | | | | |
|---|---|---|---|---|
| DE | 3408 820 A1 | | 9/1985 | |
| DE | 3541532 A1 | | 11/1985 | |
| DE | 3923241 | | 1/1991 | |
| DE | 4323295 | | 2/1995 | |
| DE | 196 14 688 A1 | | 10/1997 | |
| EP | 0318170 | | 5/1989 | |
| EP | 0507689 | | 10/1992 | |
| EP | 0587085 | | 3/1994 | |
| EP | 0743149 | | 11/1996 | |
| EP | 0 678 736 B1 | | 2/1998 | |
| FR | 2517087 | | 9/1982 | |
| GB | 1004877 | | 9/1965 | |
| GB | 1303459 | | 9/1973 | |
| GB | 2081687 | | 2/1982 | |
| GB | 2161090 A | | 1/1988 | |
| JP | 59-082936 | | 5/1984 | |
| JP | 2253835 | | 10/1990 | |
| JP | 4176608 | | 6/1992 | |
| JP | 04-201522 | | 7/1992 | |
| SU | 1310290 | * | 5/1987 | 222/58 |
| WO | 8707182 | * | 12/1987 | 366/141 |
| WO | 91/11689 | | 8/1991 | |

OTHER PUBLICATIONS

Sheet of 2 photographs of Maguire Products, Inc. gravimetric blender with Conair hoppers and feeding system, circa 1993.

Sheet of 1 photograph of Hydracolor gravimetric blender, circa 1993.

Advertisement entitled "Machinery and Systems for Extrusion is Our Only Business" by Process Control Corporation, circa 1993.

Advertisement entitled "Weigh Blender Delivers Unmatched Accuracy" by Universal Dynamics, Inc., circa 1993.

Advertisement entitled "A Full Line–up of Blender Solutions . . . Priced Right!" by HydReclaim, circa 1993.

Advertisement entitled "NEW FROM HydReclaim—Now Processors Can Economically Achieve Continuous Gravimetric Blending" by HydReclaim, circa 1993.

Article entitled "Control Loading Systems" from *Plastics Technology*, Oct. 1995, p. 41.

Advertisement "Introducing our 400 VME–II Gravimetric Blender" HydReclaim Corporation, circa 1993.

Four page brochure entitled "Gravimix Better Quality through Research", circa 1993.

Four page brochure entitled "Cocomix Plus Volumetric Blender" dated Aug. 1993.

Four page brochure entitled "Conair Franklin Autocolor Y Mezclador" dated Mar. 1995.

Two–sided flyer entitled "GB 140 Series Compact Auto Weigh Blender" published by Conair Franklin in the United States, Jun., 1994.

Six page brochure entitled "Graviblend Precise Continuous Weigh Blenders" published by Ktron Vertech, Jun., 1991, United States.

Five page brochure entitled "Blending power: GXB Blender The Better Alternative" of Mould–Tek, Sep. 20, 1998.

One page brochure "Una–Dyn Additive Feeder" (undated).

Two pages of advertisements from European Plastics News, pp. 76 and 75, Sep. 2000.

Four page brochure entitled "Novatec Gravimetric Blenders" (undated).

Maguire Products, Inc., "Weigh Scale Blender Technical Information—Specifications, Features", Nov. 4, 1994.

Six page brochure entitled "Piovan Gravimetric Blenders MDW" published by Piovan Srl, Oct. 1993, Venezia, Italy.

One page flyer entitled "Gravimix, The New Gravimetric Blending Generation" published by Ferlin, De demsvaard, Holland, circa 1993.

Four page brochure entitled "When you Weigh it All Up . . . " published by Ferlin Trading, Holland, circa 1993.

Thirty–two page catalog entitled "Maguire Color Blending Equipment" published by Maguire Products, Inc., 1993, United States.

Two page brochure entitled "Mould–Tek Bulk Handling Systems" published by Mould–Tek Industries, Inc. in Canada, circa 1993.

Brochure entitled "Plastic Molders and Extruders: published by Maguire Products, Inc., 1995".

* cited by examiner 12
19
12
19
19
21A
B
19
A
21
12
12
18
90
A
B 12
12
11
10
96
96
36
36
34
34
21
21A
136
21A
34A
40
32
140
190
30
120
22
144
24
152
186
134
138
108
14
130
15
30
17
20
154
156
144
182
184
C
D

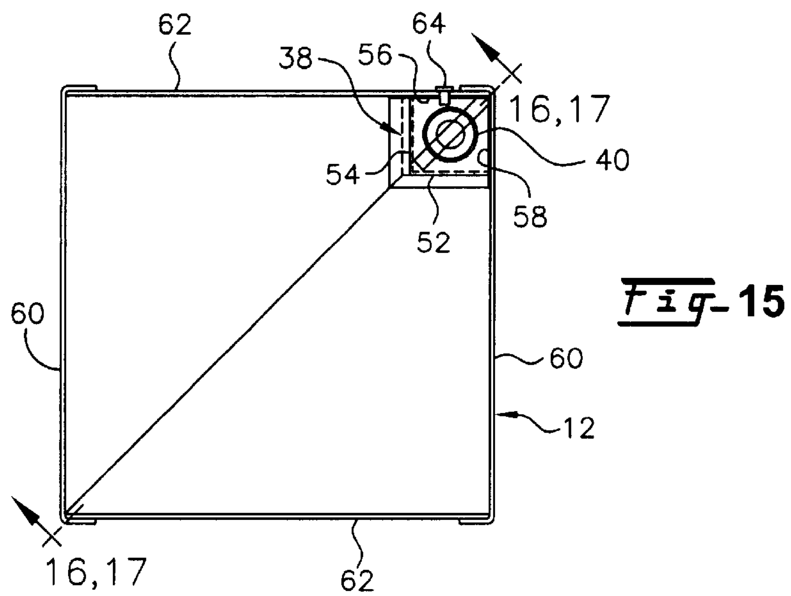
Fig-15
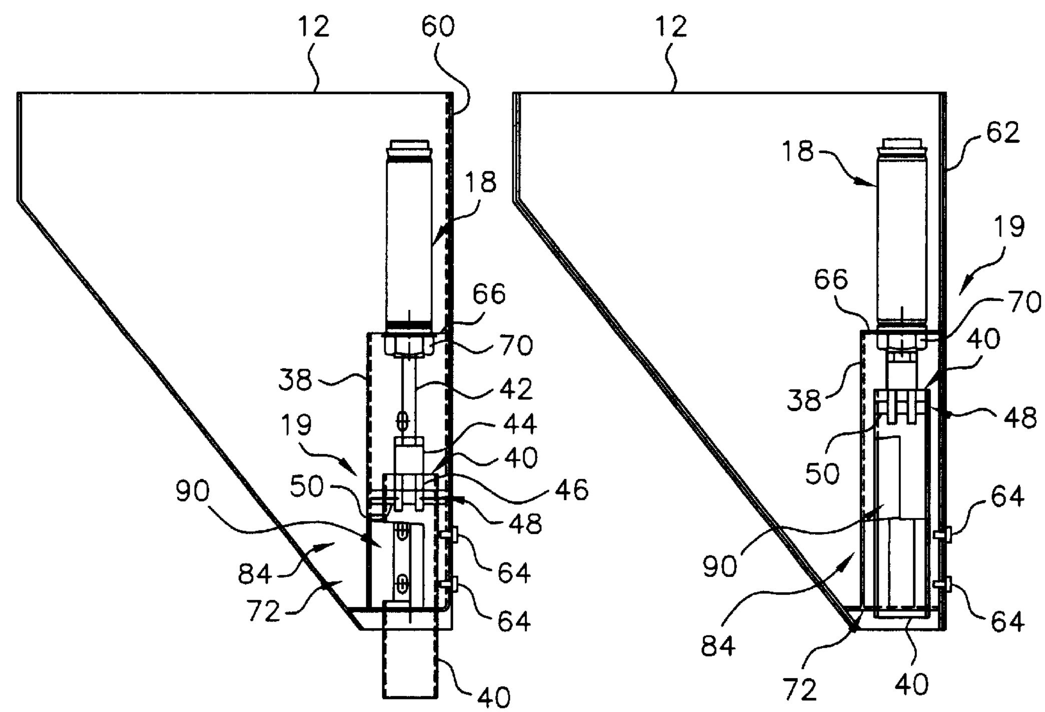
Fig-16
Fig-17

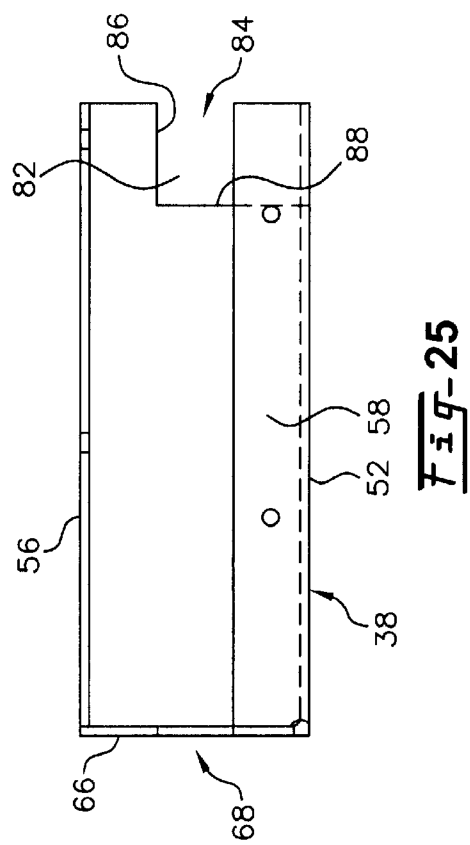
Fig-25
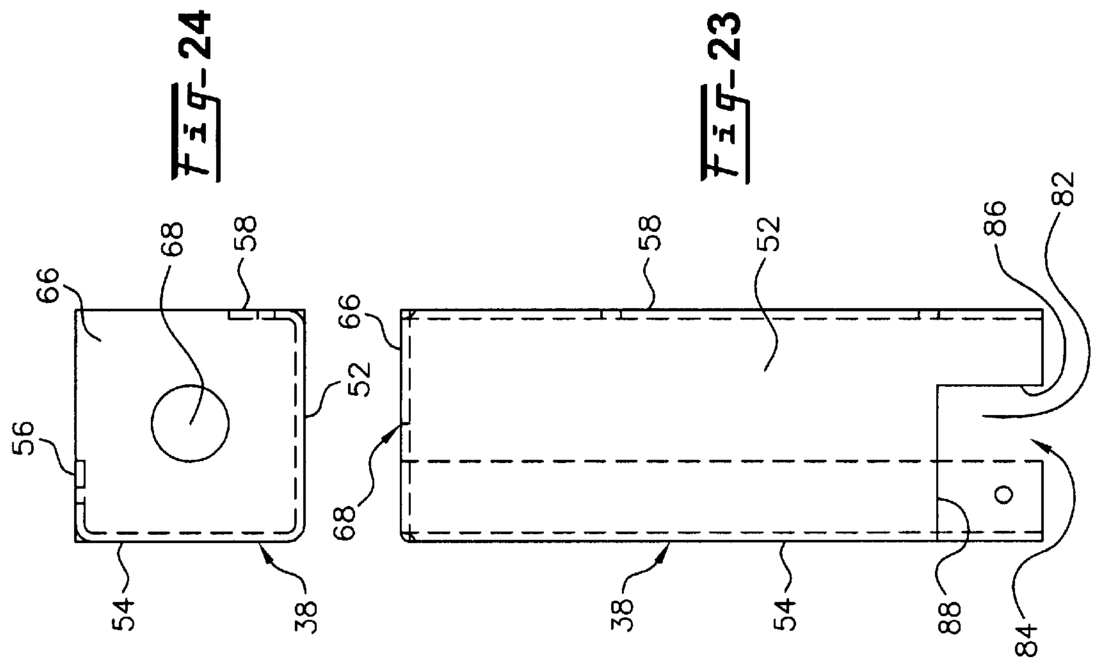
Fig-24
Fig-23

170
174
178
172
176
180

170
178
176
172
180
172
172
180

146R
151
151
148
148
150
148
148
22
150
146

22
148
146
148
148
150
150
148

120
124
130
134
126
122
128

118
112
108
121
116
110

116
108
110
118
132
121
142
114

REDUCED SIZE GRAVIMETRIC BLENDER

RELATED APPLICATION

The present application claims priority from provisional application No. 60/045,343, filed on May 2, 1997, for a "Reduced Size Gravimetric Blender", which is incorporated in its entirety herein by reference.

BACKGROUND OF THE INVENTION

This invention relates generally to methods and apparatus for providing precisely measured amounts of granular materials preparatory to further processing of the combined granular materials and specifically to gravimetric blenders providing precisely measured amounts of plastic resin material and mixing these components prior to supplying the blended mixture to plastics manufacturing and processing equipment such as plastic injection molding, compression molding and extrusion equipment.

FIELD OF THE INVENTION AND DESCRIPTION OF THE PRIOR ART

The modern gravimetric blender was essentially originated by the applicant of this invention and is widely used throughout the world by industries concerned with precision feeding of granular material, especially plastic resin material.

Gravimetric blenders operate by blending solid plastic resin material components and additives, by weight, in batches.

Typically batches of material may consist of several solid material components. One of these may be "regrind", consisting of ground plastic resin which had previously been molded or extruded and which either resulted in a defective product or was excess material not formed into a desired product.

Another component may be "natural" plastic resin which is virgin in nature in the sense that it has not previously been processed into a molded or extruded plastic part.

Yet another component may be a solid color material, typically flakes or freeze dried material, used to produce a desired color of the finished plastic part.

Still yet another component may be an additive used to adjust the blend to provide required performance characteristics during molding, extrusion or subsequent processing.

The gravimetric blender as originated by the applicant and as copied widely throughout the world typically includes hoppers for each of the components of the solid material to be blended together. Typically several hoppers or several compartments in a hopper may be provided, such as one compartment for "regrind" material, one compartment for "natural" material, one component for solid color additive material and one compartment for "additive".

When the gravimetric blender operates, the unit desirably operates automatically, adding each of the component solid materials in the proper, desired percentages. Each solid material component is dispensed by weight into a single weigh bin. Once the proper amounts of each component have been serially dispensed into the weigh bin, all of the components are dropped together into a mixing chamber from the weigh bin.

Mixing is performed, preferably continuously, and preferably even as additional batches component are dispensed in the mixing chamber. When mixing is complete, the resulting blend is preferably provided directly to the desired molding or extrusion machine.

Feedback control of the dispensed amounts of each solid material component provided to the weigh bin and measured by weight assures that in the event of an error in the amount of a dispensed component, the succeeding batch may have the blend adjusted to account for the error detected in the preceding batch of blended material.

As one of the components forming a part of the resulting blend it is known to supply solid color additives to the blend in order to provide a blend of a desired color. These color additives may be flaked pigments on wax carriers or in freeze dried form. It is also known to provide the color as pigment powder constituting one component of the resulting blend.

SUMMARY OF THE INVENTION

In one of its aspects this invention provides a gravimetric blender including a frame, a material storage hopper removably mounted on the frame, valve means proximate the hopper bottom for dispensing material within the hopper, and means connected to the hopper and remaining so upon removal of the hopper from the frame, for actuating the valve means to downwardly dispense material within the hopper, a weigh bin connected to the frame below the hopper, means connected to the frame for sensing weight of material in the bin, and a mix chamber below the weigh bin.

Desirably, the means for actuating the valve is fixedly connected to the hopper, the actuating means is at least partially within the hopper, the valve means is at least partially within the hopper, the hopper is manually removable from the frame, and it further includes a plurality of hoppers, each with valve means therewithin and respective individual valve actuation means. The actuating means is pneumatically driven and includes a vertically elongated member for transmitting motion to the valve.

The gravimetric blender includes a frame, a weigh bin, means connected to the frame for sensing weight of material in the bin, a mix chamber below the bin and connected to the frame, means connected to the frame for selectably contacting and opening the bin to release material in the bin downwardly into the mix chamber. The blender further preferably includes means for biasing an openable portion of the bin towards a closed position; the openable portion is preferably movable about a pivot; the openable portion preferably pivots about a horizontal axis; the means for selectably contacting and opening the bin is preferably pneumatically actuated; the means for selectably contacting and opening the bin is preferably a piston-cylinder combination; the cylinder is preferably outward of the frame; the piston preferably moves transversely to the axis about which the openable portion pivots; the piston may contact the bin directly or indirectly; the openable portion is preferably pivotally connected to a remaining, stationary portion of the bin.

The piston is preferably disconnected from the bin when the movable portion is at the closed position.

The invention further includes means for selectably contacting and opening the bin.

BRIEF DESCRIPTION OF THE DRAWINGS

FIG. 15 is a top view of one of the hoppers of the reduced size gravimetric blender illustrated in FIGS. 1 through 14 with the cover removed.

FIG. 16 is a sectional view taken at arrows 16—16 in FIG. 15 of the hopper illustrated in FIG. 15 showing the valve and the hopper in an open position.

FIG. 17 is a sectional view similar to FIG. 16 showing the valve and the hopper in a closed position.

FIG. 23 is a front elevation of a valve skirt which fits within a hopper such as illustrated in FIGS. 15 through 17.

FIG. 24 is a top view of the valve skirt illustrated in FIG. 23.

FIG. 25 is a side elevation of the valve skirt illustrated in FIGS. 23 and 24.

DESCRIPTION OF THE PREFERRED EMBODIMENTS AND BEST MODE KNOWN FOR PRACTICING THE INVENTION

Figure 13:
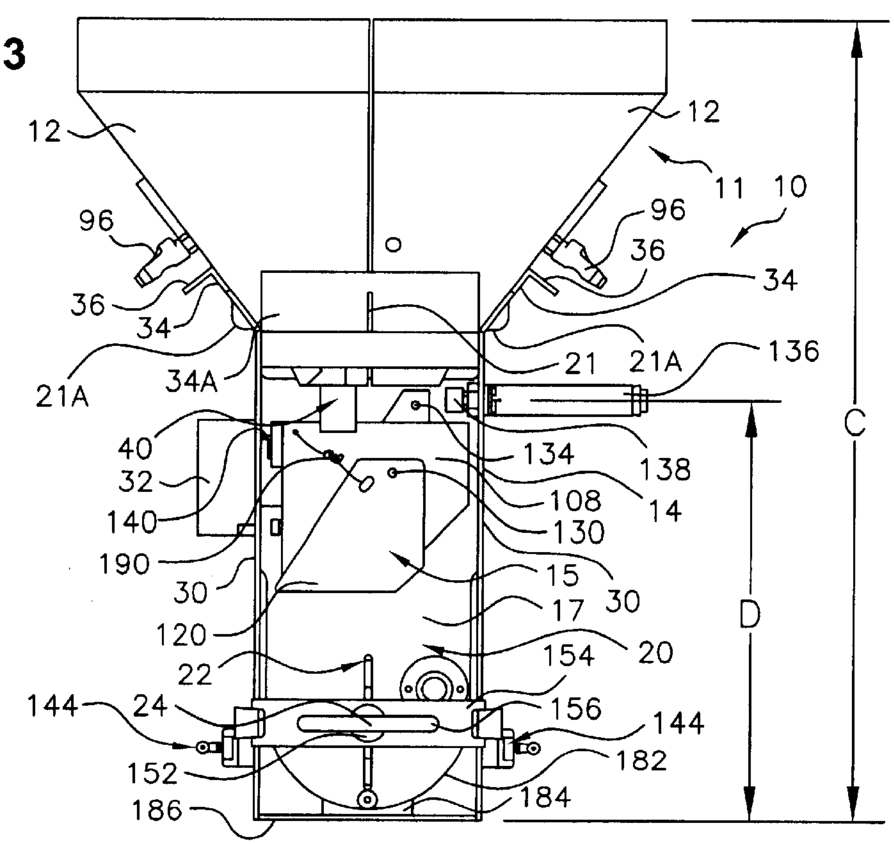
FIG. 13 is a front elevation of the reduced size gravimetric blender illustrated in FIGS. 1 through 12, with the hoppers in place.

Referring to FIGS. 1–14 and to FIG. 13 in particular, a gravimetric blender is designated generally 10 and includes a hopper assembly 11 including a plurality of hoppers, which are individually designated generally 12. The collection of hoppers 12, each of which is individually removable from blender 10 manually, without the use of tools, is supported by a frame designated generally 14 which holds a weigh bin 15 into which portions of solid plastic resin or other granular or powdery material can be metered and weighed prior to release into a mix chamber 20 as described below.

Frame 14 preferably includes four upstanding side panel members, three of which are preferably steel and formed from a single sheet, bent to form the three sides, with each of the three sides being identified 30. The remaining front side panel of frame 14, which is removable and detachable from sides 30, is designated 17 in the drawings and is preferably clear, transparent plastic.

Hopper assembly 11 with the desirable plurality of hoppers 12 allows a plurality of different solid resinous materials to be dispensed from the hoppers 12 into weigh bin 15 by suitable valve mechanisms, designated generally 19, located within and proximate to the bottom of a given hopper 12. The hoppers 12 are individually manually mountable on and removable from gravimetric blender 10 by hand, without use of tools.

The upper extremity of each solid side panel 30 of frame 14 is formed into an outwardly flared guide flap 34. In the preferred configuration since there are three solid side panels 30, three outwardly flared guide flaps 34 result. Outwardly flared guide flaps 34 are integral with and formed as a part of solid side panels 30 by bending the upper extremities of solid side panels into the shape illustrated in the drawings, particularly in FIG. 13.

A fourth outwardly flared guide flap 34A is positioned above transparent removable front panel 17 and is welded to the upper extremities of the two solid side panels 30 between which transparent removable front panel 17 fits.

Outwardly flared guide flaps 34 preferably include tab members 36 which are perpendicular to the remaining portion of guide flap 34 and extend therefrom in a generally downwardly direction. This provides a convenient handhold for an operator while lifting a hopper 12 from blender 10.

Guide flaps 34 have vertical slots formed therein at the central portions thereof with the slots extending from a lower extremity of guide flap 34 upwardly but not to the juncture of the upper edge of guide flap 34 with tab 36. These slots retain a cross-frame 21 which consists of two inter-engaging members. One of these members, which extends parallel to transparent removable front panel 17, is indicated as 21A in the figures; the other member is indicated as 21 in the figures, particularly FIG. 13.

Cross-members 21, 21A have slots formed at the central portions thereof, with one member having an upwardly facing slot and the other member having a downwardly facing slot for engagement one with another. Hence, when cross-members 21, 21A are resident in the vertical slots in outwardly flared guide flaps 34, a cross-frame defined by cross-members 21 is fixed in position relative to frame 14 for supporting hoppers 12 in position.

Cross-members 21 are notched with the notches formed in the lower surface thereof, to engage the unnumbered vertical slots in outwardly flared guide flaps 34. Engagement of the notches in the lower portions of cross-members 21 with these upwardly extending slots and the angular orientation of outwardly flared guide flaps 34 securely retains the cross-frame defined by cross-members 21 in place.

Hoppers 12 are easily individually manually lowered into position in cross-frame 21 and are easily manually lifted out thereof.

As shown in FIGS. 15 through 17, gravimetric blender 10 further includes pneumatically actuated spring-loaded piston means housed within cylinders which are wholly within hoppers 12. The piston-cylinder combinations, which are designated generally 18 in the drawings, are indirectly fixedly connected to hoppers 12 via skirts 38. Pistons of the piston-cylinder combinations 18 are preferably spring-loaded and operate in response to pressurized air to actuate tubular valve members housed within skirts 38. When the pistons move the tubular valve members housed within skirts 38, in a direction indicated by arrow A in FIGS. 16 and 17, a given piston moves a given associated valve member vertically downwardly into the position illustrated in FIG. 16, discharging granular material contained within the associated hopper 12 downwardly into the weigh bin of the blender.

When pneumatic pressure supplied to a given piston is released, an internal spring portion of the piston-cylinder combination causes the piston to retract, thereby retracting the valve member in a vertically upward direction, into the position illustrated in FIG. 17, at which the valve is closed and granular material cannot flow downwardly from hopper 12 into the weigh bin 15.

The valve members are designated generally 19 in FIGS. 16 and 17. Each valve member includes a tubular, preferably cylindrically configured stem member designated generally 40 and illustrated in FIGS. 26, 27 and 28.

Tubular stem member 40 is connected to a movable piston portion of piston-cylinder combination 18 via a piston shaft 42 as illustrated in FIG. 16. Preferably, piston shaft 42 does not directly connect with tubular stem member 40 but rather has a yoke or clevis 44 connected to the end of piston shaft 42 which is remote from piston-cylinder combination 18. Yoke 44 includes a pair of arms 46 extending from a body portion of yoke 44 in the manner illustrated in FIG. 16. Yoke arms 46 are bored with the bores through parallel yoke arms 46 being transverse thereto and parallel one with another.

A pin 48 connects yoke 44 with tubular stem member 40 by passing through the parallel bores in yoke arms 46 and through an aperture 50 in tubular stem member 40. Pin 48 fits slidably in aperture 50 and the bores in yoke arms 46.

Tubular stem member 40 is housed within a skirt designated generally 38 in FIGS. 15 through 17 and illustrated in stand-alone form in FIGS. 23, 24 and 25. Skirt 38 is of generally rectangular configuration, as illustrated in FIG. 23, and has two adjoining closed sides 52, 54 and two non-adjoining open sides 56, 58, all as illustrated in FIG. 24. Open sides 56, 58 of skirt 38 include holes, which have not been numbered in the figures, via which suitable sheet metal screws or other fasteners secure open sides 56 and 58 and therefore skirt 38 to adjoining vertically-oriented walls 60, 62 of a hopper 12. Walls 60, 62 adjoin one another at a right angle and are as illustrated in FIG. 15. One such sheet metal screw, which has been designated 64, is illustrated in FIG. 15 securing an open side 56 of skirt 38 to vertical wall 62 of hopper 12.

Skirt 38 further includes a closed top portion 66 having an aperture 68 formed therein. Piston-cylinder combination 18 is secured in place on closed top 66 of skirt 38 and passes through aperture 68 with securement being effectuated by a nut 70 which threadedly engages a threaded portion of the housing of piston-cylinder combination 18, retaining the piston-cylinder combination 18 in position on closed top 66 of skirt 38 as illustrated in FIGS. 16 and 17.

Skirt 38 is preferably formed by folding a single piece of sheet metal into the shape of closed sides 52, 54 and open sides 56, 58. Closed top 66 is preferably welded onto the single piece of metal folded to form closed sides 52, 54 and open sides 56, 58 of skirt 38.

Figure 20:
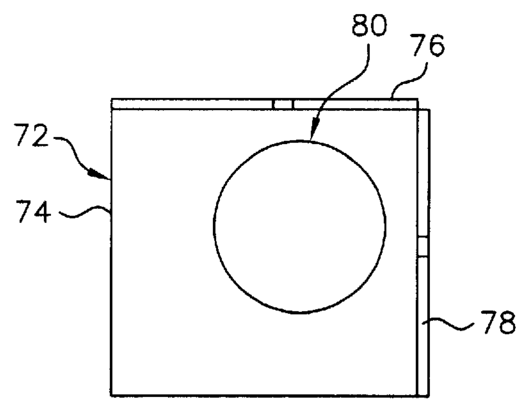
FIG. 20 is a top view of a valve holder base part used at the bottom of a hopper such as illustrated in FIGS. 15, 16 and 17.
Figure 22:
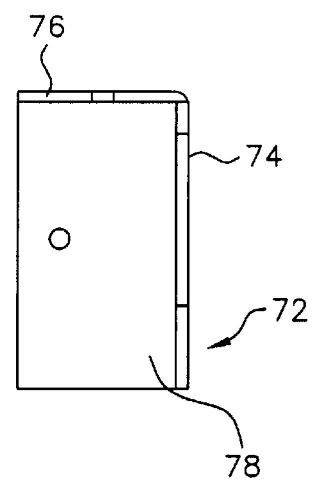
FIG. 22 is a side view of the valve holder base part illustrated in FIG. 20.
Figure 21:
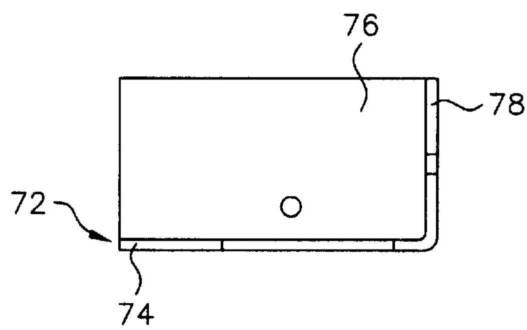
FIG. 21 is a front view of the valve holder base part illustrated in FIG. 20.

Further forming a portion of each valve assembly 19 in each hopper 12 is a valve holder base illustrated in FIGS. 20, 21 and 22 and shown in position within hopper 12 in FIGS. 15, 16 and 17. The valve holder base is designated generally 72 and is preferably fabricated from a single piece of sheet metal. Valve holder base 72 includes a flat, horizontally disposed planar portion 74 and a pair of upstanding side walls 76, 78.

Within planar portion 74 is an aperture 80 which is of suitable size for sliding clearance of the lower portion of tubular stem member 40, which resides within and reciprocates along aperture 80 in planar portion 74 as illustrated in FIGS. 16 and 17.

Side walls 76, 78 include holes formed therein to receive sheet metal screws 64 which retain valve holder base in position at the bottom of hopper 12 by passage through hopper vertical walls 60, 62. One of sheet metal screws 64 is illustrated in FIG. 17 retaining valve holder base in position within hopper 12.

The configuration of valve holder base 72 and the diameter of aperture 80 vis-a-vis the outer diameter of tubular stem member 40 are such that granular or other material contained within hopper 12 cannot pass between the exterior of tubular stem member 40 and the periphery of aperture 80. Additionally, other than aperture 80, valve holder base 72 and particularly planar portion 74 thereof close off the bottom of hopper 40. As a result, for any granular material contained within hopper 40 to exit downwardly therefrom, that granular material must pass through the hollow interior of tubular stem member 40.

The two closed sides 52, 54 of skirt 38 have rectangular cutouts formed therein at the lower extremities thereof. One of these cut-outs formed in the lower portion of closed side 52 is designated 82 in FIG. 23. Since cut-outs 82 are formed in the lower portions of closed sides 52, 54 of skirt 38, and since closed sides 52, 54 of skirt 38 are not in facing contact with vertical walls 60, 62 of hopper 12, the two communicating rectangular cutouts 82 form an open notch 84 in skirt 38 at the lower extremity thereof, facing away from the interior corner of hopper 12 defined by the juncture of vertical sides 60, 62. Notch 84 is specifically defined by a pair of vertical edges 86 formed respectively in closed walls 52, 54 and a horizontal edge 88 formed in closed walls 52, 54, as illustrated in FIGS. 23 and 25.

Figure 28:
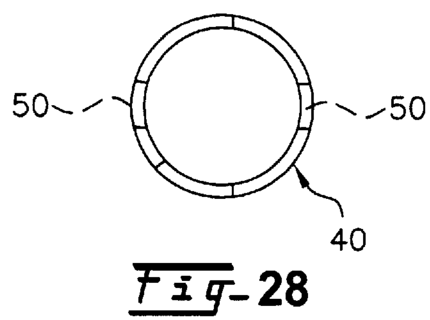
FIG. 28 is a top view of the movable tubular portion illustrated in FIGS. 26 and 27 of a valve which resides within a hopper such as illustrated in FIGS. 15 through 17.
Figure 27:
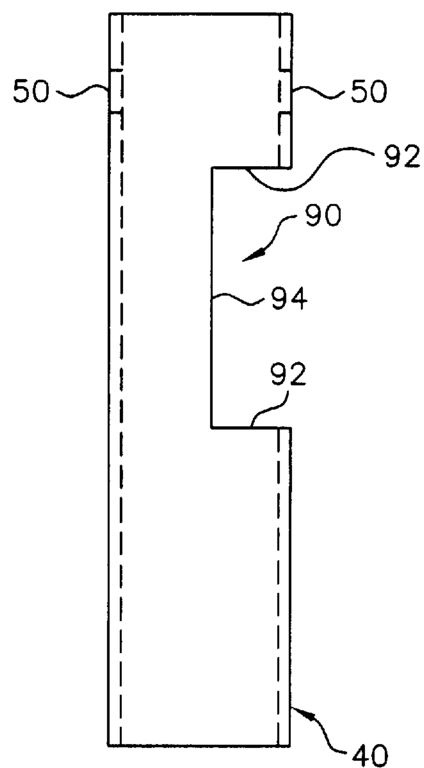
FIG. 27 is a side view of the movable tubular portion illustrated in FIG. 26 of a valve which resides within a hopper such as illustrated in FIGS. 15 through 17.
Figure 26:
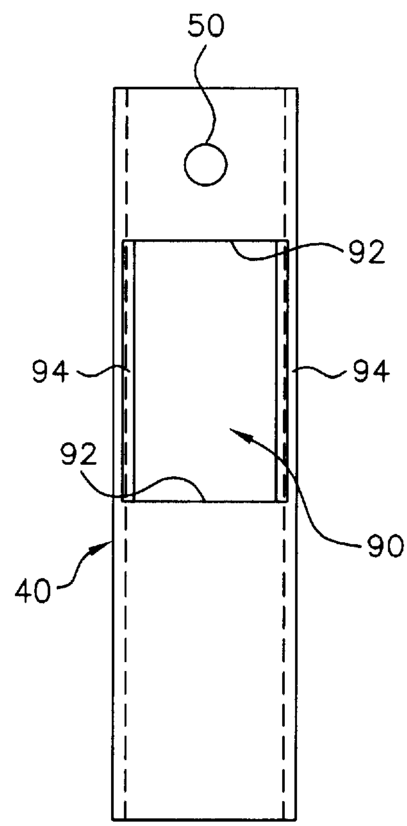
FIG. 26 is a front elevation of a movable tubular portion of a valve for on-off, shut-off operation, which resides within a hopper such as illustrated in FIGS. 15 through 17.

As shown in FIGS. 26, 27 and 28 tubular stem member 40 also has a notch 90 formed therein. Notch 90 is defined by a pair of semi-circular edges 92 and a pair of vertically extending edges 94 connecting edges 92 thereby to define a semi-cylindrical notch 90.

As illustrated in FIGS. 16 and 17 showing the valve assembly 19 in hopper 12 in the open and closed positions respectively, at the open position the piston in piston-cylinder combination 18 is extended such that piston rod 42 is vertically extended downwardly and notch 90 in tubular stem member 40 is in facing communication with notch 84 in skirt 38. With tubular stem member 40 in this relationship with skirt 38, communication between notch 84 and notch 90 permits flow of granular material downwardly from within hopper 12 into the hollow interior of tubular stem 40 and downwardly therethrough out of hopper 12. This configuration is illustrated in FIG. 16.

When the piston in piston-cylinder combination 18 is retracted, tubular stem member 40 is carried upwardly into a position at which notch 90 is not in communication with notch 84. At this position, communication from the interior of hopper 12 with notch 90 is blocked by closed sides 52, 54 of skirt 38 as illustrated in FIG. 17. As a result, granular material within hopper 12 cannot reach the hollow interior of tubular stem member 40 and thus cannot flow downwardly through the hollow interior of tubular stem member 40 out of hopper 12. Hence, the valve assembly 19 is closed when in the position illustrated in FIG. 17.

Piston-cylinder combination 18 is preferably a spring-loaded piston-cylinder combination such that a spring within the cylinder serves always to urge the piston portion of the combination vertically upwardly considering FIGS. 16 and 17 into the position at which tubular stem member 40 does not communicate with the interior of hopper 12 and hence valve assembly 19 is closed. Application of pneumatic pressure to piston-cylinder combination 18 drives the piston of the combination downwardly, against the force of the spring, thereby moving tubular stem member 40 into the position at which the valve member 19 is open. The valve member remains open for so long as the pneumatic pressure is applied to piston-cylinder combination 18. When the pneumatic pressure is released, the spring forces the piston vertically upwardly in FIGS. 16 and 17, thereby closing valve member 19.

An important aspect of the invention is the feature whereby the valve members designated generally 19 are entirely contained within hoppers 12 and are fixedly secured thereto. As a result, when an operator desires to change a hopper, all that is required is for the operator to disconnect a pneumatic tube from a pneumatic fitting 96 on a given hopper and lift the hopper off of the supporting cross-frame 21 and outwardly flared guide flaps 34 on which the hopper rests. Note that hoppers 12 are not mechanically secured to the remainder of blender 10; this is not necessary. The external pneumatic fitting for each hopper is designated 96 and illustrated in FIG. 13. A pneumatic line 98 leads from fitting 96 to the piston-cylinder combination 18 within each hopper 12; this is illustrated in FIG. 14.

One of the important features of this invention is the compact size of the gravimetric blender. The compact size of this blender facilitates use of this blender with very small injection molding and compression molding machines and with small extruders. The small size of the blender in the preferred embodiment of the invention facilitates dispensing of exceedingly small and precisely measured amounts of plastic resin material and other granular materials, as well as liquid color if that might be desired as a part of the blend, for supplying such small molding machines and extruders.

Figure 1:
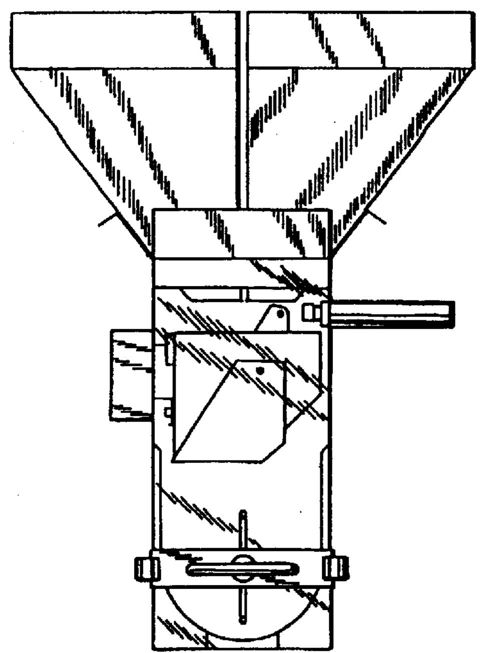
FIG. 1 is a front elevation of a reduced size gravimetric blender illustrating principally, but not entirely, design aspects the invention.
Figure 2:
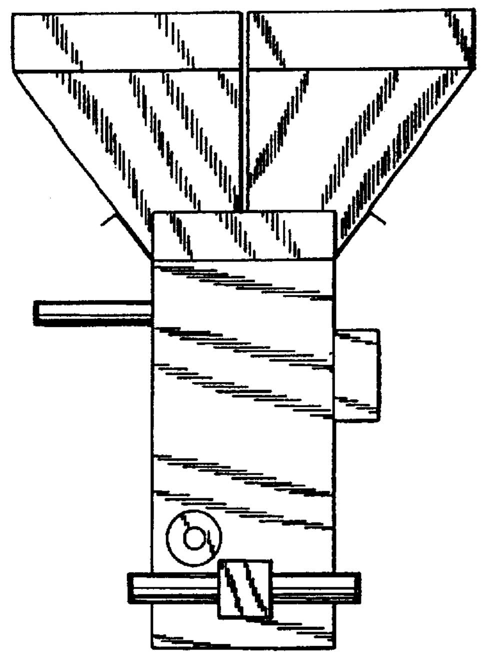
FIG. 2 is a rear elevation of a reduced size gravimetric blender illustrated in FIG. 1, illustrating principally, but not entirely, design aspects of the invention.
Figure 4:
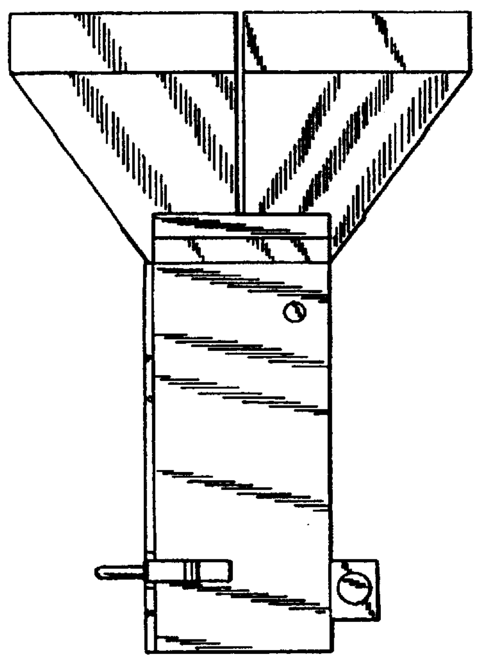
FIG. 4 is a right side (with reference to the blender positioned as shown in FIG. 1) elevation of a reduced size gravimetric blender illustrated in FIGS. 1, 2 and 3, illustrating principally, but not entirely, design aspects of the invention.
Figure 3:
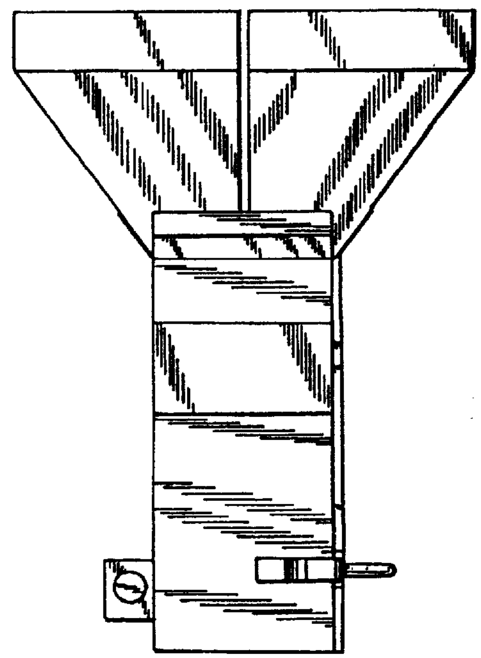
FIG. 3 is a left side (with reference to the blender positioned as shown in FIG. 1) elevation of a reduced size gravimetric blender illustrated in FIGS. 1 and 2, illustrating principally, but not entirely, design aspects of the invention.
Figure 7:
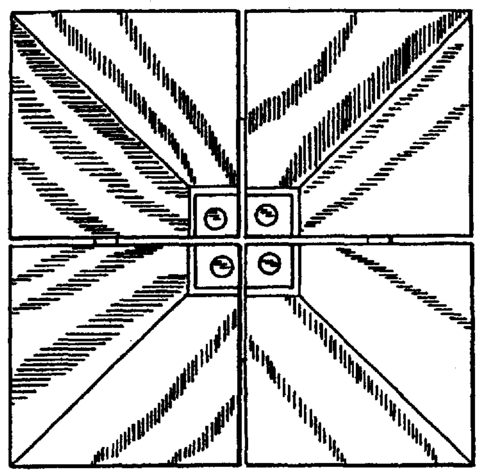
FIG. 7 is a top elevation of a reduced size gravimetric blender illustrated in FIGS. 1, 2, 3, 4, 5 and 6, but with the top of the hopper open, illustrating principally, but not entirely, design aspects of the invention.
Figure 6:
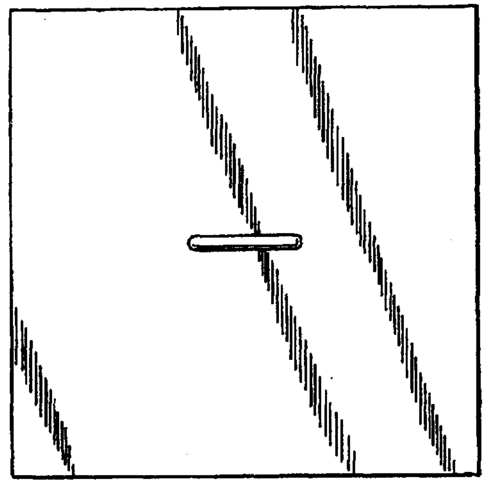
FIG. 6 is a top elevation of a reduced size gravimetric blender illustrated in FIGS. 1, 2, 3, 4 and 5, illustrating principally, but not entirely, design aspects of the invention.
Figure 5:
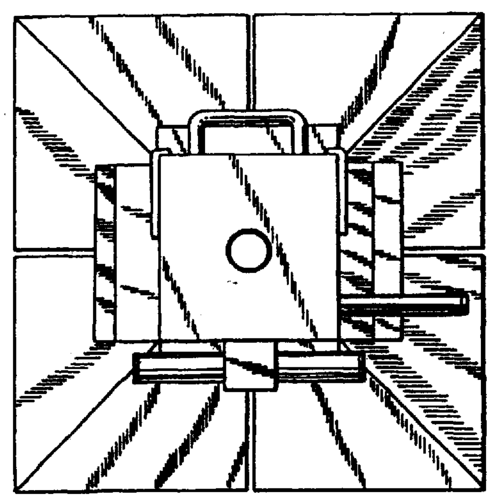
FIG. 5 is a bottom view of a reduced size gravimetric blender illustrated in FIGS. 1, 2, 3 and 4, illustrating principally, but not entirely, design aspects of the invention.
Figure 8:
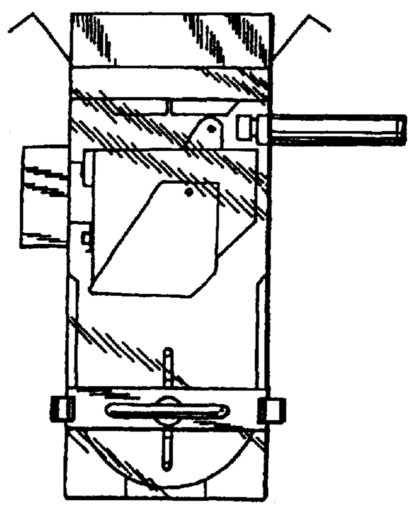
FIG. 8 is a front elevation of a reduced size gravimetric blender shown in FIGS. 1 through 7, but with the hopper removed, illustrating principally, but not exclusively, design aspects of the invention.
Figure 9:
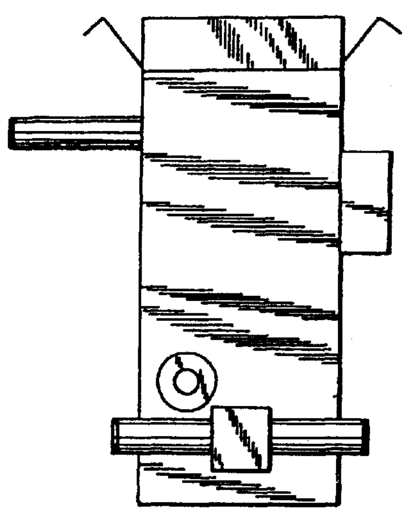
FIG. 9 is a rear elevation of a reduced size gravimetric blender shown in FIGS. 1 through 8, but with the hopper removed, illustrating principally, but not exclusively, design aspects of the invention.
Figure 11:
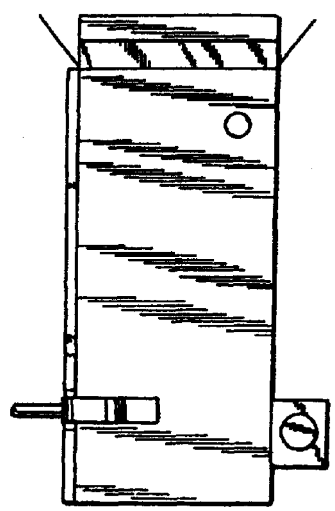
FIG. 11 is a right side elevation of a reduced size gravimetric blender shown in FIGS. 1 through 10, but with the hopper removed, illustrating principally, but not exclusively, design aspects of the invention.
Figure 10:
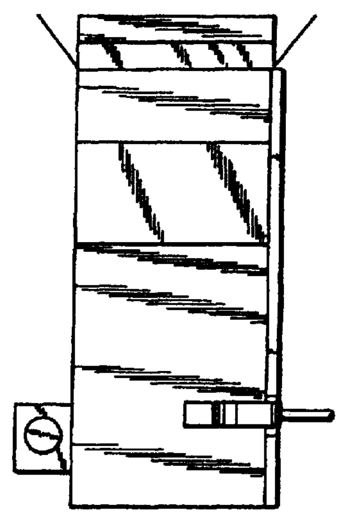
FIG. 10 is a left side elevation (with reference to the blender positioned as shown in FIG. 8) of a reduced size gravimetric blender shown in FIGS. 1 through 9, but with the hopper removed, illustrating principally, but not exclusively, design aspects of the invention.
Figure 12:
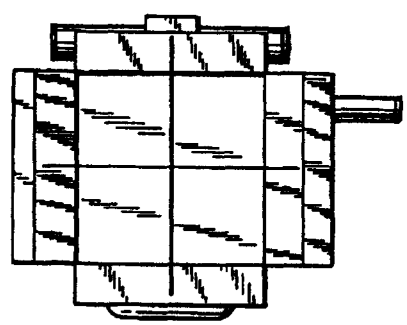
FIG. 12 is a top view of a reduced size gravimetric blender shown in FIGS. 1 through 11, but with the hopper removed, illustrating principally, but not exclusively, design aspects of the invention.
Figure 14:
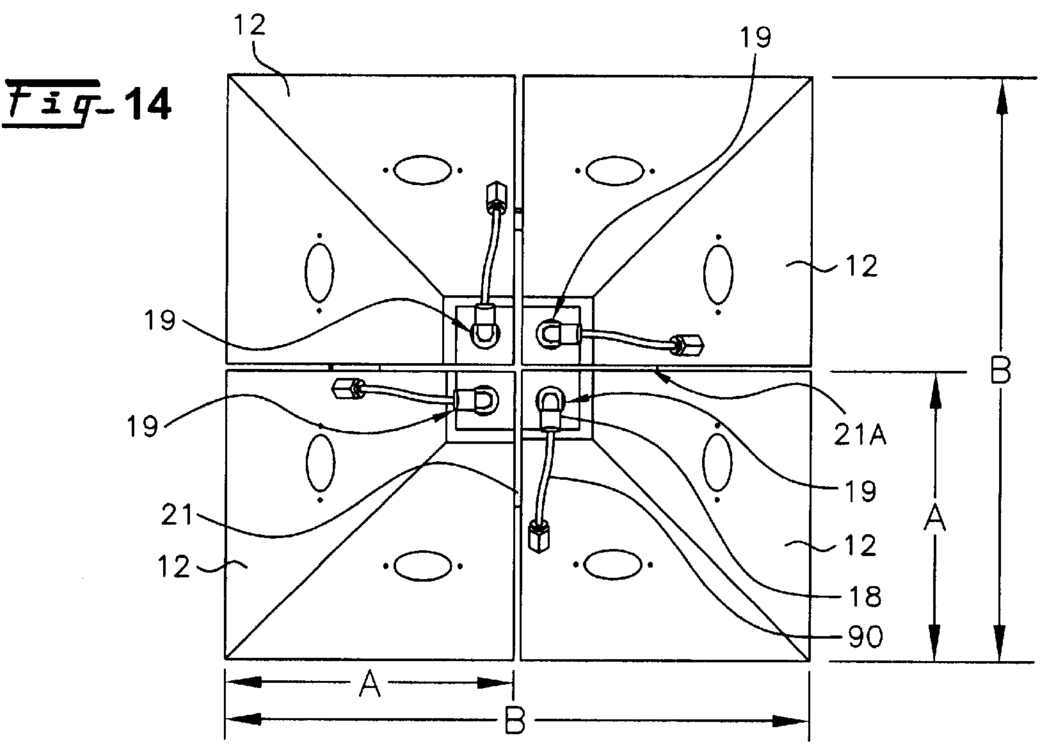
FIG. 14 is a top view of the reduced size gravimetric blender illustrated in FIGS. 1 through 13, with the hoppers in place and the cover removed from the hoppers.

In the preferred embodiment of the invention, hoppers 12 are eight inches square at the upper extremities thereof; this is denoted by dimension A in FIG. 14. The close spacing together of adjacent hoppers, with adjacent hoppers being only about one-eighth inch apart, which is the thickness of the cross-members defining cross-frame 21, results in an overall maximum width dimension indicated as B in FIG. 14 of about sixteen and one-eighth inches in the preferred embodiment of the invention.

Similarly, the blender in the preferred embodiment of the invention is very compact in height. In the preferred embodiment, the blender is only about twenty-two inches from the top of the hoppers to a base portion of the blender frame. This twenty-two inch dimension is indicated by dimensional arrow C in FIG. 13. The pneumatic piston which preferably actuates the weigh bin to dump the weigh bin contents into the mixing chamber is preferably about eleven and five-eighth inches above the base; this dimension is indicated by dimensional arrow D in FIG. 13.

With this arrangement of hoppers 12 as illustrated generally in FIGS. 13 and 14, the blender of the invention may be operated with only a single hopper in place or with two or with three or all four hoppers in place. Absence of one hopper or more than one hopper does not adversely affect operation.

Depending on the particular material being fed and blended, piston-cylinder combinations 18 may be operated to open and to close valve members 19, i.e. to move valve members 19 between open and closed positions. Alternatively, if it is desired to very precisely regulate the amount of granular material supplied from a given hopper 12, piston-cylinder combination 18 may be operated in a pulsating fashion with the piston rapidly reciprocating as pulses of pneumatic pressure are alternately applied and relieved respecting the piston of piston-cylinder combination via pneumatic fitting 96.

Figure 18:
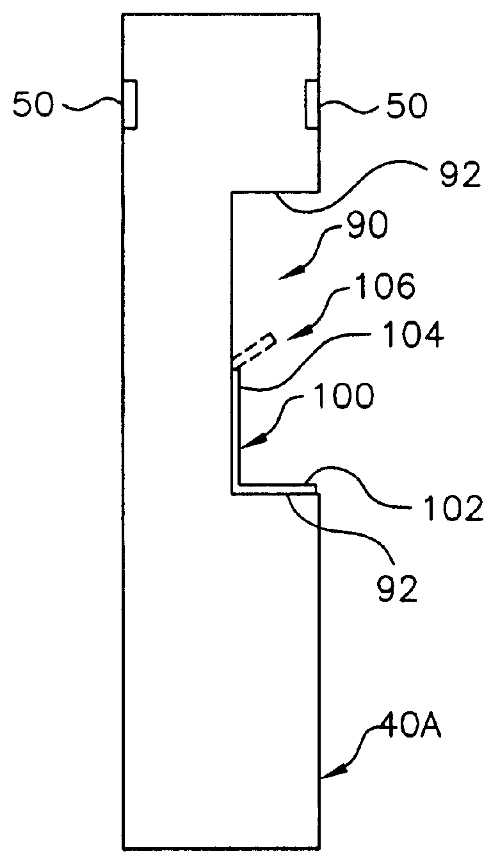
FIG. 18 is a side elevation of a movable tubular portion of a valve for pulsing, controlled feeding operation which resides within a hopper such as illustrated in FIGS. 15 through 17.
Figure 19:
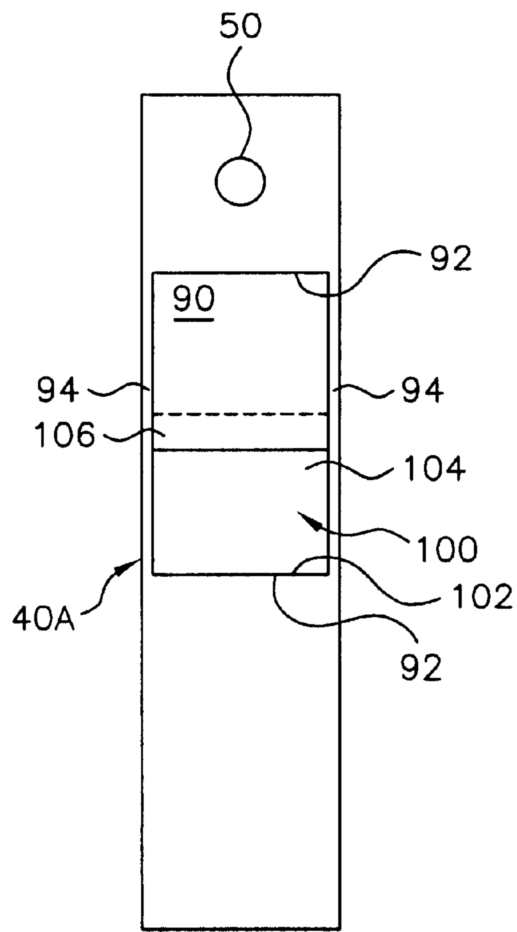
FIG. 19 is a front elevation of the structure illustrated in FIG. 18.

FIGS. 18 and 19 illustrate an alternate embodiment of the tubular stem member which has been designated 40A in FIGS. 18 and 19. In this embodiment, tubular stem member 40A has a blocking wall 100 positioned in notch 90 where blocking wall 100 includes a horizontal portion 102 and a vertically extending portion 104. Horizontal portion 102 runs along and is secured to a lower one of semi-circular edges 92 while vertical portion 104 extends vertically upwardly therefrom and runs along and is connected to vertical edges 94 up to approximately the vertical midpoints thereof, as illustrated in FIG. 19. An outwardly angled lip, of generally curved configuration, designated 106 in FIGS. 18 and 19 may be optionally provided at the upper extremity of vertical portion 104; the optional character of outwardly angled lip is denoted by the dotted lines in which it is shown in FIGS. 18 and 19.

With this configuration of the blocking wall 100 in place on tubular stem member 40A, when the associated piston-cylinder combination is operated in a pulsed fashion, the rate of dispensing of granular material from the associated hopper may be extremely closely controlled.

Referring to FIG. 13 positioned within and preferably slidably retained by frame 14 below weigh bin 15 is a mix chamber 20 having a mixing means which is preferably in the form of a mixing agitator 22 rotatably disposed therewithin. Agitator 22 is mounted for rotation about an axis 24 preferably shared with a pneumatically powered reciprocating rotary drive (not shown).

Weight of material in weigh bin 15 is preferably sensed by a load cell 32 which is preferably connected to a microprocessor control, not illustrated in the figures, which regulates operation of gravimetric blender 10 through electrical connection with the load cell 32, the actuators which control the piston-cylinder combinations 18 which actuate the valves 19, the pneumatic drive, the piston-cylinder controlling weigh bin dump and the like.

The microprocessor provides control of gravimetric blender 10 by monitoring, preferably on a continuous basis, weight of material, if any, at a weighing station defined by weigh bin 15. By sensing the weight of material within the weigh bin 15 and actuating appropriate piston-cylinder combinations 18 in given hoppers 12, the microprocessor serially meters respective components of solid granular resinous material to the weighing station defined by weigh bin 15 until a pre-selected weight of each of the respective components has arrived at the weigh station.

Blender 10 preferably operates by blending components by weight based on settings provided to and retained within the microprocessor.

Each granular material component is preferably dispensed separately into weigh bin 15 and then all components are dropped together into mixing chamber 20.

Blender 10 is designed to mount directly over the feed throat of a process machine used to mold or extrude plastic material with blender 10 being bolted or otherwise fixedly connected to the process machine.

When exclusively solid materials are being blended, typically regrind material is dispensed first according to the percent of regrind material required. If no regrind material or a limited amount of regrind material is present, then portions of natural material, solid color material and additive material are increased to bring about a full batch weight. Natural material is typically added second. The amount of natural material added is preferably calculated by the microprocessor to leave exactly the right amount of room in the mix chamber for the solid color material and additive material. Once the natural material fill portion of the cycle has been completed, the exact weight of the natural material that has been actually dispensed is determined to detect any errors. Based on this actual weight of natural material dispensed, color additive in the form of solid color additive material is metered into the weigh bin, then other solid additive materials are metered into the weigh bin in the same manner. All components are then dumped into the mixing chamber which is preferably continuously running.

In the case where liquid color material is used in place of solid color material, the liquid color material is preferably added to the weigh bin last.

The microprocessor provides the serially metered components and the optional preselected weight of liquid color material unitarily to a mixing station defined by mix chamber 20 by opening weigh bin 15 thereby to permit the materials vertically supported thereby to fall downwardly into the mix chamber. Weigh bin 15 is preferably opened by a pneumatic piston-cylinder combination 136, which is controlled by the microprocessor and is illustrated in FIG. 13. Pneumatic piston-cylinder combination 136 is mounted on frame 14 and is proximate to, but not in contact with, weigh bin 15 so that weigh bin 15 opens responsively to movement of the piston member of the piston-cylinder combination 136.

Weigh bin 15 is illustrated in FIG. 13 in solid lines in the closed position. Weigh bin 15 is opened by actuating piston-cylinder combination 136, causing a piston rod to extend.

When weigh bin 15 is in the closed position, there is no contact nor connection with the piston or its actuating cylinder.

In mix chamber 20 the solid material components which have been preferably unitarily supplied and serially metered in weigh bin 15, and optionally a pre-selected weight of liquid color material, are mixed into a blend preparatory to being supplied to the manufacturing processing machine such as a molding press or an extrusion machine.

Desirably, monitoring of weight of material at the weighing station is performed continuously by the microprocessor continuously digitally sensing signals supplied by the load cell identified generally 32. Weigh bin 15 is suspended by and from load cell 32 with respect to frame 14.

The microprocessor actuates to dispense material as required.

The solenoid valves and especially the solenoid actuators of the valves are preferably maintained within an enclosed frame which is remote from the blender and hence is not shown in the figures. As with the microprocessor, the valves and their associated actuators are preferably remote from the gravimetric blender, being connected thereto via suitable pneumatic tubing.

Vertically extending extremities may provide an open envelope structure which permits weigh bin 15 and particularly a weigh bin bracket to move slidably horizontally, in a direction perpendicular to the plane of the paper in FIG. 13, to be positioned so that weigh bin 15 effectively hangs on and is cantilevered from load cell 32.

Affixed to load cell 32 for receiving the weight load and transferring the same to load cell 32 is a load transfer beam having an upper horizontally extending portion fixedly connected by a screw to the upper surface of load cell 32, a lower generally horizontally extending portion and a central portion extending between upper and lower portions and being slightly canted from the vertical. Load cell 32 senses the weight load of weigh bin 15 and any material contained therein by strain resulting at the upper surface of load cell 32 where the load transfer beam is fixedly connected thereto. Load cell 32 is fixed to a load cell enclosure box, particularly to a lower horizontally extending portion of the load cell enclosure box via suitable screws.

Affixed to a central portion of a load transfer beam is a load transfer plate which is preferably slotted at the central portion thereof with the slot being relatively short, preferably being only about 1 inch in length, to receive a screw which extends laterally from vertical portion of a weigh bin bracket, as weigh bin 15 is slidably positioned on and supported by a load transfer plate. In this position weigh bin 15 may be effectively cantilevered with respect to load cell 32 and the load represented by the weight of the weigh bin 15 and any material contained therein is transferred directly to load cell 32 by the load transfer plate and load transfer beam, with load cell 32 effectively sensing the weight of material contained within the weigh bin 15.

To protect load cell 32 from contact and possible damage by operators, load cell 32 is preferably within a load cell enclosure box as illustrated in FIG. 13. The load cell enclosure box is in turn preferably connected to a load cell mounting plate by suitable nut and bolt combinations. The nut and bolt combinations are spaced away from and do not contact frame 14.

Load cell 32 is fixedly connected to the bottom of the load cell enclosure box via screw connectors which rigidly hold the load cell in position vis-a-vis the load cell enclosure box. Hence the bottom of the load cell is fixed whereas the upper portion of the load cell, where the load is sensed, is free to deflect in response to loads applied as result of material being in the weigh bin 15.

Suitable load cells are available from Tedea Huntleigh, an Israeli company. Model 1010 load cells available from Tedea Huntleigh may be used.

Solenoid actuated valves are available in the United States under the trademark MAC; the model 45A-L00-DDAA-1BA9 is suitable.

Figures 39, 40:
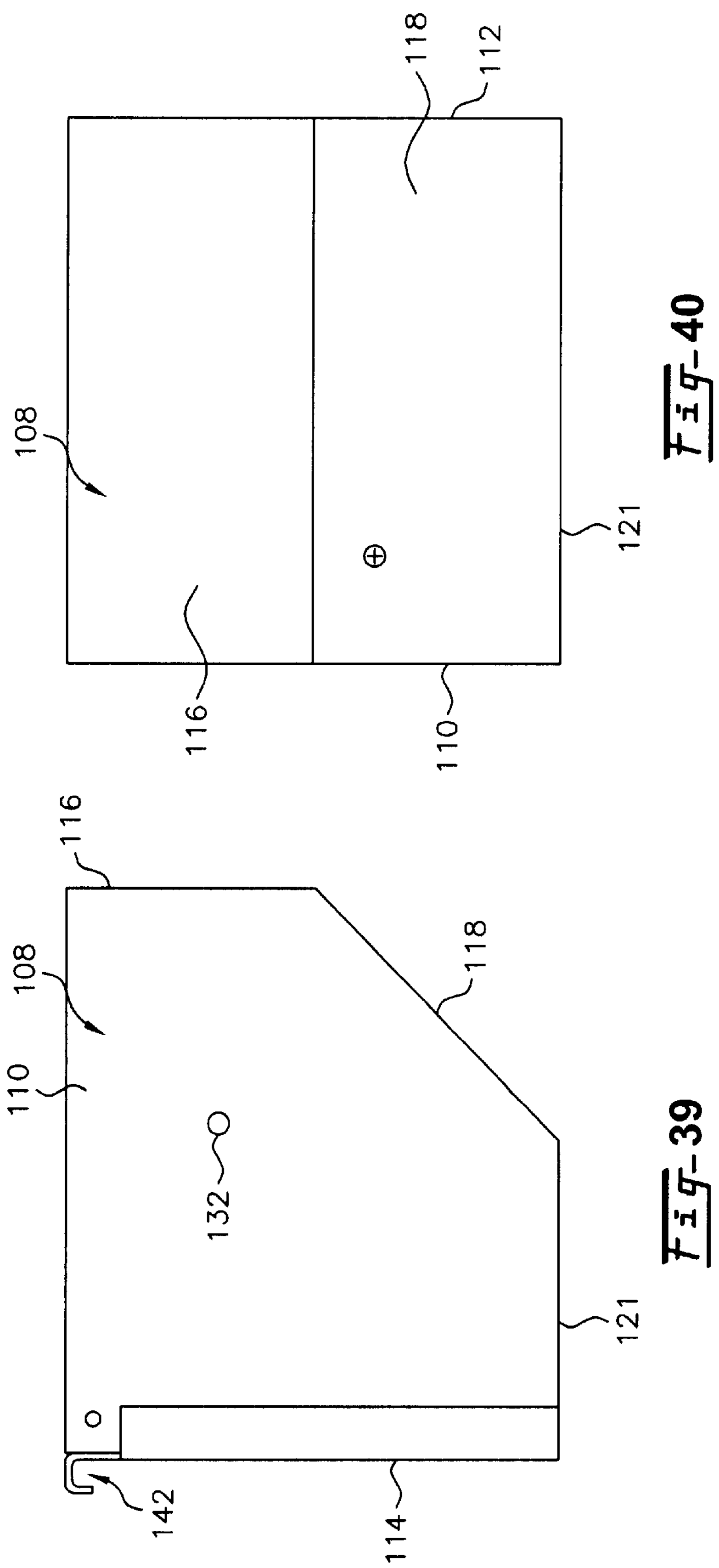
FIG. 39 is a front elevation of the stationary weigh bin basket portion.
FIG. 40 is a right side elevation of the structure illustrated in FIG. 39.

Weigh bin 15 includes a stationary open bottomed basket portion 108 illustrated in FIGS. 39 and 40 where basket portion 108 is also visible in FIG. 13. Basket portion 108 is preferably formed of sheet metal in the manner shown generally in FIG. 39 with planar front and rear portions designated 110, 112 in FIGS. 39 and 40. The top of basket 108 is open to receive granular material, and optionally liquid color, from above, with the granular material being supplied from one or more of hoppers 12.

Basket 108 further includes one vertically elongated side 114 at one side of basket 108 and a vertically foreshortened side 116 at the other side of basket 108.

Basket 108 further includes a sloped downwardly facing surface 118. The bottom of basket 108, designated 121 in FIGS. 39 and 40, is open to permit downward flow of granular and, optionally, liquid color material, out of basket 108.

Weigh bin 15 further includes a dump flap designated generally 120 in the drawings which is pivotally connected to basket portion 108 so that upon pivotal motion of dump flap 120, the contents of basket 108 are dropped out of weigh bin 15 and permitted to fall into mix chamber 20. Dump flap 120 is illustrated in FIGS. 37 and 38 and is also clearly visible in FIG. 13.

Figures 37, 38:
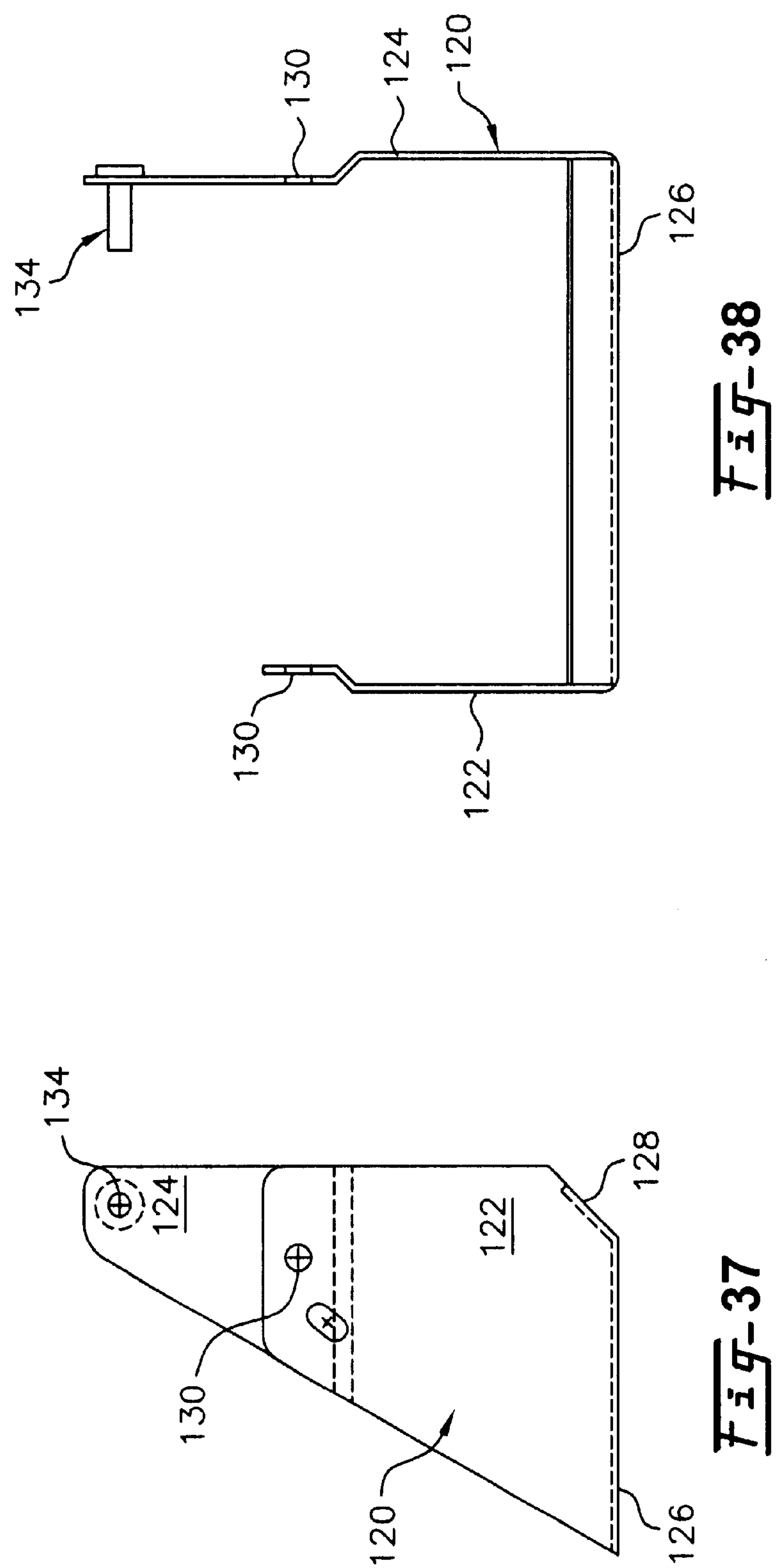
FIG. 37 is a front view of the weigh bin dump flap.
FIG. 38 is a side view of the weigh bin dump flap illustrated in FIG. 37.

As shown in FIGS. 37 and 38, dump flap 120 includes a pair of upstanding wall portions 122, 124, both of which extend generally vertically upwardly from a planar bottom portion 126. Dump flap 120 further includes an angled bottom portion 128 which is positioned at an angle to essentially complementally fit against sloped downwardly facing surface 118 of basket 108, as shown in FIG. 13.

Upstanding walls 122, 124 of dump flap 120 have apertures 130 formed therein on a common horizontal axis. Apertures 130 receive pin, screw or other pivotal connection means for pivotally connecting dump flap 120 to basket 108 through similar apertures 132 formed in sides 110, 112 of basket 108.

Affixed to a vertical extremity of an upstanding extension portion of upstanding wall 124 of dump flap 120 is a flat head rivet 134, which is preferably welded in position.

Mounted in one of solid side panels 30 of frame 14, specifically the right hand solid side panel 30 as illustrated in FIG. 13, is a piston-cylinder combination designated generally 136 in FIG. 13. Piston-cylinder combination 136 is preferably mounted using a suitably threaded nut, illustrated in FIG. 13 but not numbered, which engages a threaded collar portion of piston-cylinder combination 136 protruding through an aperture of suitable size in side panel 30.

Affixed to the end of a piston rod extending from piston-cylinder combination 136 is a preferably plastic, such as nylon, knob 138 illustrated in FIG. 13.

When material within weigh bin 15 is to be dumped, piston-cylinder combination 136 is actuated by supply of pressured air thereto. This causes the piston portion of piston-cylinder combination 136 to extend, moving to the left in FIG. 13. As a result, knob 138 contacts the flat head rivet 134 which is fixed in the upper extremity of vertical side wall 124 of dump flap 120 thereby causing dump flap 120 to pivot in a counterclockwise direction, viewed in FIG. 13, about a pivot point defined by pivotal connections mounted in apertures 130 illustrated in FIG. 13.

This pivotal, rotary motion of dump flap 120 in a counterclockwise direction (considering FIG. 13) about pivot point 130 opens the bottom of basket 108 permitting material contained within the weigh bin defined by dump flap 120 and basket 108 to drop into the mixing chamber.

Note that knob 138 only contacts flat head rivet 134 when piston-cylinder combination 136 has been actuated and the dumping operation is taking place. At all other times, there is no physical contact between weigh bin 15 and knob 138. A spring 190 biases dump flap 120 towards the closed position.

Weigh bin 15 is connected to load cell 32 through an aperture in solid side panel 30 of frame 14, specifically the left hand one of solid side panels 30 considering FIG. 13, by a slide mount bracket 140 which is bolted to load cell 32 and extends laterally and then upwardly to fit within a downwardly facing lip 142 formed at an upper extremity of vertically elongated side 114 of basket 108, as illustrated in FIG. 39. Hence, basket 108 and therefore weigh bin 15 effectively hang from load cell 32 so that load cell 32 senses the weight of weigh bin 15 and any granular and, optionally, liquid color, material contained within the weigh bin.

Other suitable means for mounting weigh bin 15 respecting load cell 32 are disclosed in pending U.S. patent application Ser. No. 08/763,053, now U.S. Pat. No. 6,007,236, filed in the name of Stephen B. Maguire on Dec. 10, 1996, and Patent Cooperation Treaty patent application PCT/US96/19485, filed Dec. 10, 1996 by Maguire Products, Inc., the disclosures of which are incorporated by reference.

Mixing agitator 22 is rotatably journeled in preferably transparent, removable front panel 17 of frame 14. Panel 17 fits closely along forwardly facing edges of solid side panels 30 and is fixed thereto via quick release, hand-actuated clips designated generally 144 in FIG. 13. These clips are mountingly connected to a horizontal bar 154 extending across front panel 17 at a lower portion thereof, which provides a solid, preferably metal receptacle mounting for journeling of agitator 22 in transparent removable front panel 17.

Fixed rotatable journeling of agitator 22 in transparent removable front panel 17 provides an important safety feature. If an operator removes front panel 17 by disengaging clips 144, agitator 22 remains fixed to front panel 17 and disengages from the rotary reciprocating drive means, discussed below, and is removed from the mix chamber 20 whenever front panel 17 is removed from blender 10. This provides an important safety advantage in that agitator 22 ceases rotation as panel 17 is moved even slightly away from contact with solid side panels 30. Hence, if an operator reaches inside blender 10, there are no moving parts to inflict injury when front panel 17 has been removed.

Figure 34:
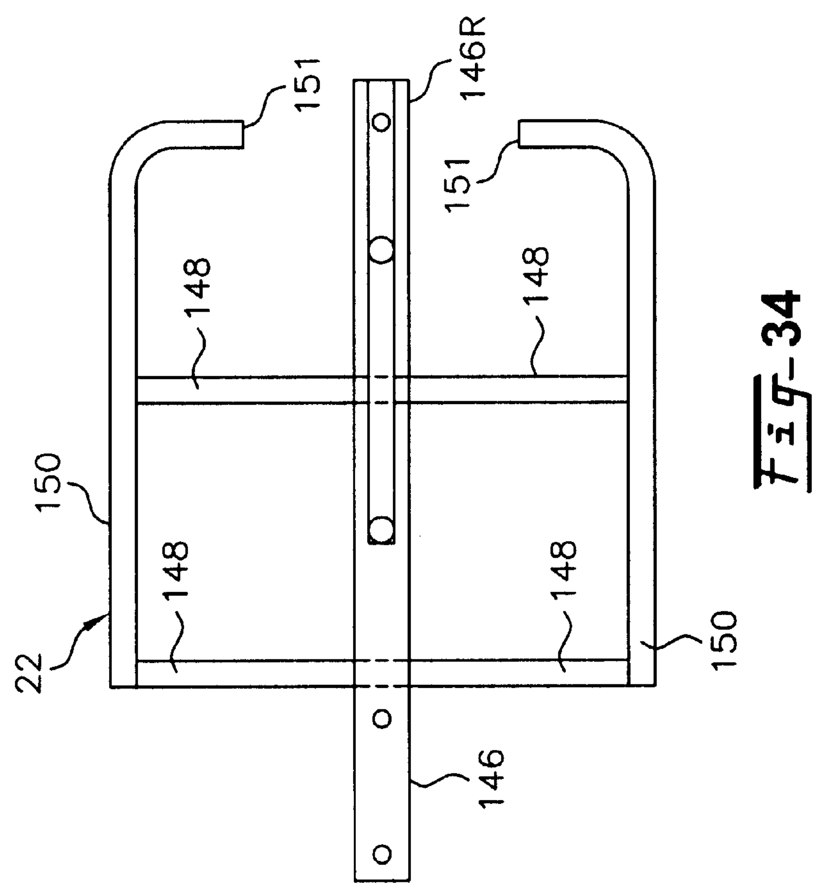
FIG. 34 is a side elevation of the agitator shown in FIG. 33.
Figure 33:
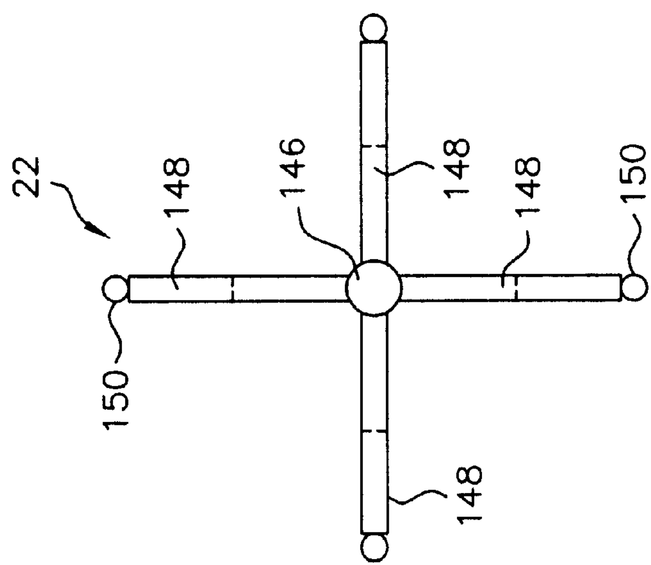
FIG. 33 is a front elevation of the agitator.

As illustrated in FIGS. 33 and 34, agitator 22 includes a central shaft portion 146 with a number of spokes 148 extending radially outwardly therefrom. Extending longitudinally along the outer extremities of radial spokes 148 are mixer rails 150 which extend longitudinally along a major length of central shaft 146 and are curved radially inwardly at the ends of rails 150 which are remote from front panel 17 when the agitator is journeled in panel 17.

Journeling of central shaft 146 in front panel 17 is accomplished using a plastic, preferably Nylon or Celcon, cylindrical bearing member 152 illustrated in FIG. 13. The left end of shaft 146 (when considering FIG. 34) fits into bearing member 152. Mixer rails 150 and particularly the curved, radially inwardly facing extremities thereof 151 stop short of center shaft 146 in order to provide clearance for a coupling member which removably connects the agitator 22 to the rotary reciprocating drive means.

To facilitate removal of front panel 17 from blender 10, and to provide strength for journeling of-bearing member 152 in front panel 17, the horizontal metal bar or strap 154 is affixed to front panel 17 and provides a position of attachment for clips 144. A handle 156 is mounted on strap 154 and provides convenient hand gripping for removal of front panel 17 when clips 144 have been disengaged.

Agitator 22 is driven in a manner to reciprocatingly rotate so that agitator 22 rotates about axis 24 defined by central shaft 146 through an angle of about 270° and then reverses, rotating in the opposite direction thorough an angle of about 270°. This is accomplished by using a drive consisting of two pneumatically driven piston-cylinder combinations reciprocating a rack to which a pinion gear is connected. This drive means is a purchased item and is mounted on the exterior of a rear panel 30 of frame 14 in position to provide coaxial driving rotation of agitator 22.

Means for coupling and decoupling agitator 22 to the reciprocating rotational drive means is provided by a coupling assembly having male and female members which are illustrated generally in FIGS. 29 through 32.

Figure 32:
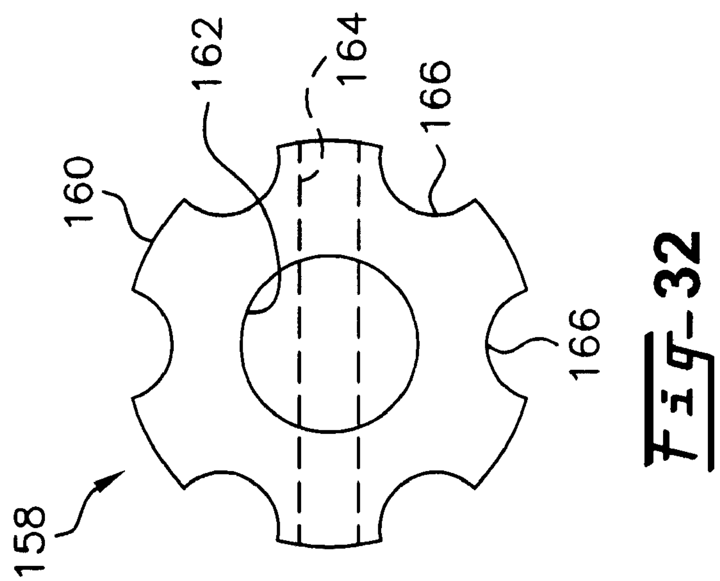
FIG. 32 is a front view of the structure illustrated in FIG. 31.
Figure 31:
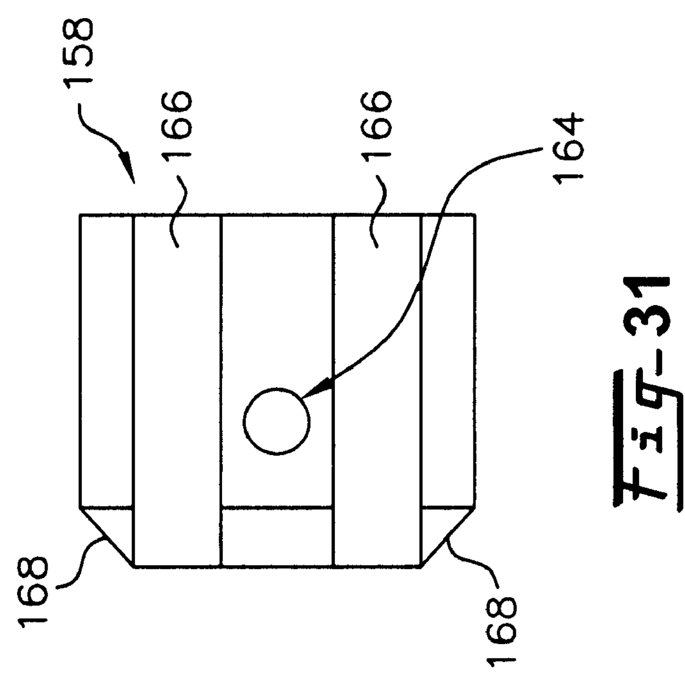
FIG. 31 is a side view of a male portion of the coupling apparatus for the agitator and the pneumatic drive apparatus.

The smaller of the two members forming the coupling is designated generally 158 and is illustrated in FIGS. 31 and 32. This smaller member is referred to as a male member and is generally cylindrically configured with a curved, cylindrical exterior surface 160, an axially elongated bore 162 extending therethrough and a transverse bore 164. Axially elongated bore 162 is of appropriate size for fitting of male member 158 on end 146R of shaft 146 of agitator 22, as illustrated in FIG. 34. Set screws or suitable pins in transverse bore 164 may be used to affix male member 158 to end 146R of central shaft 146.

Figures 29, 30:
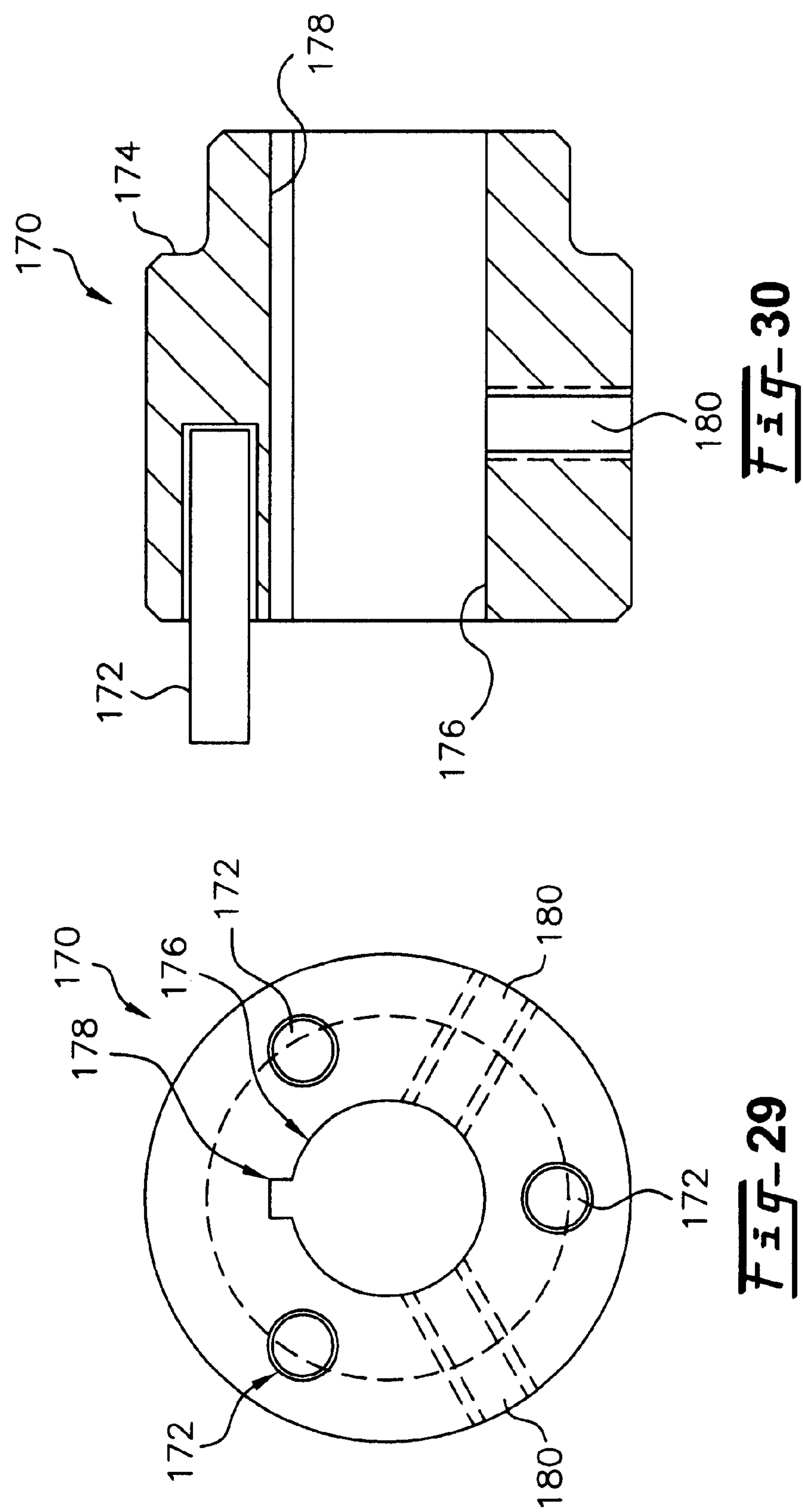
FIG. 29 is a front view of the female member of a coupling between the reciprocating rotating pneumatic drive and the agitator.
FIG. 30 is a side sectional view of the structure illustrated in FIG. 29.

Formed in outer surface 160 of male member 158 are a plurality of angularly evenly spaced flutes 166 which extend axially respecting male member 158 and are concave, as illustrated in FIG. 32. Concave flutes 166 are provided to receive and to fit about pins which extend outwardly from a female member 170 as illustrated in FIGS. 29 and especially in FIG. 30, with one pin 172 being illustrated in position in FIG. 30. The longitudinal extremity of male member 158, which faces away from agitator 22 and towards female member 170 when male member 158 is assembled on and affixed shaft 146, is chamfered with such chamfers indicated as 168 in FIG. 31. These chamfers facilitate engagement of male member 158 generally and specifically of flutes 166 with pin members 172 of female member 170, so that the pin members may reside within flutes 166 in essentially complemental, facing contact. Male member 158 is preferably plastic, most preferably Celcon or Nylon.

Female member 170 illustrated in FIGS. 29 and 30 is of generally cylindrical configuration, with an annular shoulder 174 defining a stepdown from a larger cylindrical diameter to a smaller cylindrical diameter. The end of female member 170 of smaller cylindrical diameter is the end which is closer to the source of reciprocating rotational movement and is journaled in a rear solid panel 30 of frame 14, in a position of axial alignment with bearing member 152 when transparent removable front panel 17 is in position as a part of frame 14.

Female member 170 further includes a longitudinal bore 176 extending the longitudinal length thereof with a keyway 178 formed in bore 176. Keyway 178 is provided for fitting about a driving shaft providing the source of reciprocating rotational movement for agitator 22.

A pair of radial bores 180 are provided in the larger cylindrical sectional portion of female member 170 for set screws or other pin connections to tightly retain female member 170 on the drive shaft coming from the source of reciprocating rotational motion.

As can readily be envisioned by comparing FIGS. 30 and 32, pins 172 fit within flutes 166 and easily find those flutes 166 when the front panel 17 is put into position and the male member 158 fixedly connected to shaft 146 is pushed towards female member 170 and especially pins 172. Chamfer surfaces 168 on male member 158 facilitate pins 172 finding flutes 166 and moving into complemental, facing engagement therewith. Once this has been accomplished, driving rotation of female member 170 by the reciprocating rotational drive means results in corresponding one-to-one rotation of male member 158 and consequent rotation of agitator 22.

One of the important features of the invention is that the integral construction of the valve and hopper assembly permits the valve to be removable integrally with the hopper, thereby permitting various size valves to be mounted in hoppers. This facilitates changing of valve size by the user so that the user merely need remove the hopper having a given size valve and substitute another hopper having a smaller or other desired size valve in its place. The integral valve-hopper design also contributes to safety in that individuals cannot actuate a valve and injure themselves when a hopper is removed from the blender. The valve and the shut-off mechanism for granular material simply is not present when the hopper is not in place. Once the hopper is in position, an individual cannot insert the individual's fingers into the way of any of the moving parts of the valve within the hopper.

The air cylinders actuating the valves are preferably spring return air cylinders; internal springs act to pull the cylinder pistons up and pull the rods attached to the pistons into the vertical position, creating a shut-off. When the tubular members 40 are in the extreme vertically upward positions, no material can flow downwardly therethrough; the hopper is necessarily closed at the bottom and can easily be removed without spilling any material that may be in the hopper.

In the variation of this valve which is illustrated in FIGS. 18 and 19, where the hemispheric or half-circular opening in a tubular portion is covered at the bottom and has a wall running upwardly, this tubular valve member 40A may be reciprocated up and down to provide very accurate downward metering of material. When such accurate metering of material is desired, a stroke limiter in the form of a sleeve of plastic may be used on the rod 42 which connects the associated piston to the yoke 44.

The piston-cylinder combination 18 is desirably reciprocated electronically, permitting the piston to cycle up to six times per second providing the reciprocation of the tubular stem member 40A. Skirt 38 is stationary, fitting around the reciprocating tubular stem member 40A, skirt 38 is secured to hopper 12 by sheet metal screws going through the hopper into the skirt. The skirt is stationary when the valve is in the hopper and shields the tubular stem member 40 as tubular stem member 40 moves up and down. Skirt 38 allows granular material to enter tubular stem member 40 only when tubular stem member 40 and particularly the notch 90 therein is below the horizontal edge 88 defining the upper boundary of notch 84.

Skirt 38 is preferably a single piece of sheet metal having two full-size or closed sides and two shortened or flanged or open sides facing the two surfaces or walls of hopper 12 to provide complete closure around tubular stem member 40.

One pneumatic line preferably goes to each hopper 12 with a quick disconnect fitting to allow the hopper to be removed from the blender. Air is pulsed back and forth by solenoid valves. Since the piston-cylinder combinations have spring return pistons, only one line is needed to each piston-cylinder combination. This is in contrast to prior art gravimetric blenders in which two lines are provided to piston-cylinder combinations driving the various slide gates and other parts of the machine.

In the instant invention, the pneumatic supply line goes through the side of each hopper 12 and connects to the piston-cylinder combination within the hopper. Removal of the hopper and piston-cylinder combination is facilitated by disconnecting the pneumatic line at the quick disconnect fitting 96 provided on the exterior of each hopper 12 and picking off each hopper 12 and its associated piston-cylinder assembly 18 which is one effectively unitary assembly and may be lifted directly off of the top of blender 10.

Another important aspect of the invention is in the provision of the separation of knob 138 from flat head rivet 134 for opening the dump flap 120 of weigh bin 15. With piston-cylinder combination 136 and knob 138 physically separated from weigh bin 15, there is no external connection to weigh bin 15 during the weighing process and therefore, there is no chance of something such as a pneumatic line introducing an error into the weighing procedure.

Figure 36:
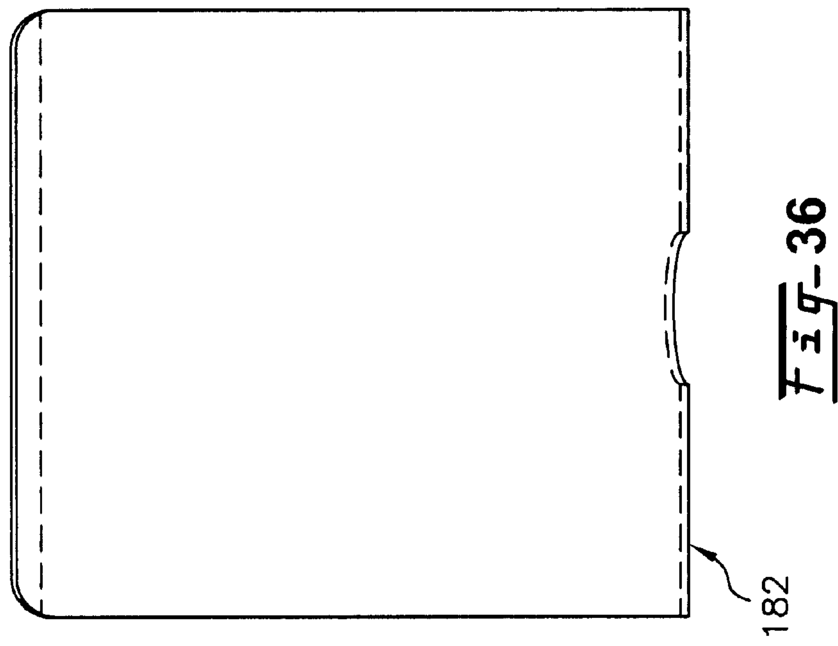
FIG. 36 is a top view of the liner for the mix chamber illustrated in FIG. 35.
Figure 35:
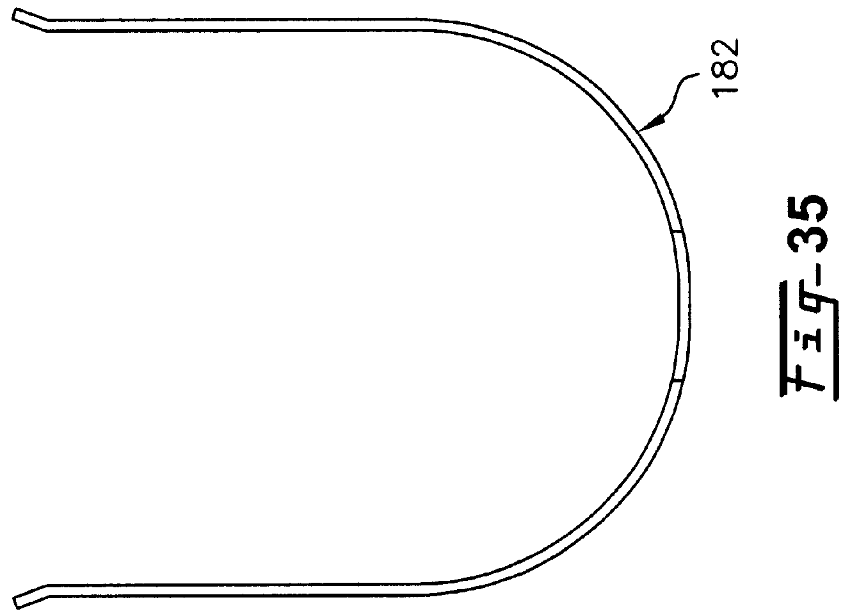
FIG. 35 is a front view of the liner for the mix chamber.

Respecting mixing chamber 20, mixing chamber 20 is equipped with a curved side and bottom member which slides into and, out of the mixing chamber. This curved member is visible in FIG. 13, is illustrated separately in FIGS. 35 and 36 and is designated generally 182 in the figures and sometimes referred to as a mix chamber insert slide. Insert slide 182 rests on a plastic saddle 184 which is visible in FIG. 13. Saddle 184 is secured to the metal bottom 186 of frame 14. Solid side panels 30 of frame 14 are preferably welded to bottom 186 along the three sides of respective contact therewith. Bottom 186 preferably protrudes forwardly relative to sides 30 so as to provide a bottom support transom for transparent removable front panel 17 when panel 17 is in place on blender 10.

The reciprocating rotational motion provided by the drive unit rotates agitator 22 approximately 270° in one direction and then 270° in the opposite direction.

One advantage of the coupling defined by male and female members 158, 170 with the pins 172 of female member 170 engaging the flutes 166 of male member 158 is that there are no closed bottom holes into which pins 172 must fit. With an "open" coupling such as provided by male and female members 158, 170, there is less likelihood of catching pellets of the granular material in the coupling itself.

Yet another feature of the invention is with agitator 22 being journaled within and removable unitarily with transparent removable front panel 17, there is no need for any interlock between front panel 17 and the drive means providing the reciprocating rotational drive for the agitator. Since agitator 22 is removed with transparent front panel 17, whenever panel 17 is removed, the only moving part remaining in the mixing chamber is the rotating female member 170.

When the blender of the invention is used, there is preferably a single controller provided for each blender at a remote locale. The controller and microprocessor preferably are not mounted on the frame of the blender as is the case with known, larger gravimetric blenders.

Material components which should be fed and controlled in very, very small amounts, such as color components, may be controlled to levels of 3% or 4% of the total blend when the pulsing action of a piston-cylinder combination is applied to a modified version of the tubular stem member 40A as illustrated in FIGS. 18 and 19. In addition to color additives, ultraviolet stabilizers, inhibitors, strengtheners and the like sometime need to be fed in such very, very small amounts into plastic resin blends prior to molding.

In the blender, there is provided a proximity sensor, which is not indicated in the figures. This sensor fits through a rear wall 30 of frame 14 and protects the machine by shutting off the machine when material in the mix chamber reaches a certain level. These proximity sensors are known in the art.

Using the modification of the tubular stem member 40A illustrated in FIGS. 18 and 19 and with pulsing action of the spring equipped piston-cylinder combination 18 allows very fine feeding of material. If air pressure is reduced to piston-cylinder combination 18, so as to soften the severity of the reciprocation of the air cylinder, the air cylinder can be regulated to a point where as little as two to three grams of material per second can be accurately fed and feeding can be repeatedly controlled at that rate.

Utilizing the reduced size gravimetric blender of the invention, approximately 400 grams of material may be produced in less than one minute. Hence, about fifty pounds per hour of blended resin material can be produced using the blender of the invention.

The valve assembly 19 with the full half-cylindrical notch go in the tubular stem member as illustrated in FIGS. 26 and 27 may dispense material at about 35 grams per second. When the pulsing technique is used, and the modified version of the tubular stem member 40A illustrated in FIGS. 18 and 19 is used, feeding of plastic resin material pellets can be controlled to less than one gram per second.

I claim the following:

1. A gravimetric blender comprising:

a. a vertically elongated rectangular frame having at least one of a transparent panel or open side between panels extending substantially the vertical height of said frame;

b. a material storage hopper removably mounted on said frame and comprising means within said hopper and proximate the hopper bottom for dispensing material within said hopper;

c. a weigh bin connected to said frame below said hopper;

d. means connected to said frame for sensing weight of material in said bin; and e. a mix chamber below said weigh bin.

2. The gravimetric blender of claim 1 wherein said means for dispensing material within said hopper includes a valve and means for actuating said valve, wherein said valve and said valve actuating means are fixedly connected to said hopper.

3. The blender of claim 2 wherein said actuating means is at least partially within said hopper.

4. The blender of claim 3 wherein said valve means is at least partially within said hopper.

5. The blender of claim 3 wherein said valve means is fully within said hopper.

6. The blender of claim 2 wherein said actuating means is fully within said hopper.

7. The blender of claim 2 wherein said hopper with said valve and actuating means affixed thereto is manually removable from said frame.

8. The blender of claim 2 further comprising a plurality of hoppers, each with valve means therewithin and respective individual valve actuation means.

9. The blender of claim 2 wherein said actuating means is pneumatically driven and includes a vertically elongated member for transmitting motion to said valve.

10. The blender of claim 2 wherein said actuating means comprises a piston-cylinder combination connected to said hopper wall.

11. The blender of claim 1 further comprising means connected to said frame for selectably contacting and opening said bin to release material in said bin downwardly into said mix chamber.

12. The blender of claim 11 wherein said means for selectably contacting and opening said bin is pneumatically actuated.

13. The blender of claim 11 wherein said means for selectably contacting and opening said bin is a piston-cylinder combination.

14. The blender of claim 13 wherein said cylinder is outward of said frame.

15. The blender of claim 13 wherein said piston moves transversely to the axis about which said openable portion pivots.

16. The blender of claim 13 wherein said piston contacts said bin directly.

17. The blender of claim 13 wherein said piston contacts said bin indirectly.

18. The blender of claim 1 further comprising means for biasing an openable portion of said bin towards a closed position.

19. The blender of claim 18 wherein said openable portion is movable about a pivot.

20. The blender of claim 19 wherein said openable portion pivots about a horizontal axis.

21. The blender of claim 18 wherein said openable portion is pivotally connected to a remaining, stationary portion of said bin.

22. The blender of claim 1 wherein said frame is a single piece of material.

23. The blender of claim 22 wherein said frame is steel.

24. The blender of claim 22 wherein said frame has three closed sides, two of which are parallel and perpendicular to the remaining closed side.

25. The blender of claim 22 wherein said frame extends vertically upwardly in a straight line from the bottom of said blender to said hopper.

26. The blender of claim 22 wherein one side of said frame is open.

27. The blender of claim 22 further comprising an upwardly extending removable panel adapted for fitting together with said frame to provide an enclosure for said weigh bin.

28. A gravimetric blender comprising:

a. a frame;

b. a weigh bin mounted on said frame, having an aperture at the bottom thereof and comprising;

i. a movable weigh pan defining a portion of the bin bottom, being moveable between positions at which a portion of said pan covers said aperture and at which said aperture is open;

ii. a sloped section forming a portion of said bin bottom and extending downwardly from a bin side;

iii. remaining sides of said bin having co-planar lower extremities;

iv. at least a central part of said pan when said pan is in a position at which said aperture is open being below said sloped portion;

c. means, connected to said frame, for sensing weight of material in said bin;

d. a mix chamber below said bin and connected to said frame including mixing means therewithin;

e. means for selectably moving said pan between said position covering said aperture at which said pan defines a portion of said bin bottom and said position at which said aperture is open for releasing material in said bin downwardly into said mix chamber.

29. The blender of claim 28 wherein said sloped section is planar.

30. The blender of claim 28 wherein said remaining sides of said bin are of common vertical height.

31. The blender of claim 28 wherein said central part of said weigh bin in said aperture uncovering position is parallel with said sloped section.

32. The blender of claim 28 wherein said central part of said weigh bin and said aperture open position is under said sloped section.

33. A gravimetric blender comprising:

a. a vertically elongated frame having a plurality of vertically elongated panels, two of said panels being spaced apart to define an open side of said frame therebetween with said panels defining an enclosure for a weigh bin and a mix chamber;

b. a material storage hopper mounted on said frame;

c. said weigh bin connected to said frame below said hopper;

d. means, connected to said frame, for sensing weight of material in said bin as received from said hopper;

e. said mix chamber below said bin and receiving material therefrom including rotatable mixing means comprising a mixer therewithin;
f. an additional vertically elongated panel adapted for fitting over said open side of said frame to close said enclosure, said additional panel being transparent;
g. drive means supplying rotary motion for said mixer; and
h. means transferring rotary motion from said drive means to said mixer disconnecting said mixer from said drive means upon disconnection of said additional panel from said frame.

34. The blender of claim 33 further comprising means connecting said mixer to said additional panel for axial movement of said shaft responsive to said panel disconnecting from said frame which provides movement of said mixer unitarily with said panel upon panel disconnection.

35. The blender of claim 33 wherein said mixer rotary motion is around an axis perpendicular to said additional panel.

36. The blender of claim 33 wherein said drive means is operable for supplying arcuate rotary motion to said mixer.

37. The blender of claim 36 wherein said arcuate rotary motion supplied by said drive means is fixed in amount.

38. The blender of claim 36 wherein said drive means arcuately reciprocates said mixing means.

39. The blender of claim 36 wherein said arcuate motion is less than a full circle.

40. The blender of claim 36 wherein said arcuate motion is greater than a full circle.

41. The blender of claim 36 wherein said drive means arcuately reciprocates said mixing means through arcs which are less than full circles.

42. The blender of claim 36 wherein said drive means is pneumatically driven.

43. In a gravimetric blender including a vertically elongated frame, at least one granular material storage hopper connected to the frame, a valve for dispensing granular material from the hopper through an orifice in the bottom of the hopper, a weigh bin below the hopper to receive granular material dispensed from the hopper, means for sensing weight of granular material received in the weigh bin and a mix chamber below the weigh bin for collecting and mixing granular material dropped from the weigh bin after material weight has been sensed, the improvement comprising the frame being a single sheet of metal bent in two places at ninety degree angles along vertical lines to form three (3) vertically extending panel members, outer ones of the panel members being parallel and extending in a common direction from the central one of the panel members to define three sides of a rectangle with a fourth side remaining open to expose space within the frame for view of the weigh bin and the mix chamber residing within that space, and a transparent panel closing the open fourth rectangular side of the frame and being removably mounted on the frame to permit operator access to the weigh bin and mix chamber residing within the frame.

44. A gravimetric blender including a vertically elongated frame, at least one granular material storage hopper at the top of the frame, means for dispensing granular material downwardly from the hopper through an orifice in the hopper bottom, a weigh bin below the hopper receiving granular material dispensed from the hopper, means for sensing weight of granular material received in the weigh bin and a mix chamber below the weigh bin for collecting and mixing granular material dropped from the weigh bin after material weight has been sensed, the improvement comprising the hopper resting on supporting structure forming the top of the frame with the hopper being manually removable by it being liftable from the frame without the use of tools, with the means for dispensing granular material from the hopper through an orifice in the hopper bottom being fixedly connected to the hopper and removable therewith upon the hopper being lifted from the frame.

45. A gravimetric blender including a vertically elongated frame, at least one granular material storage hopper connected to the frame, means for dispensing granular material from the hopper through an orifice in the hopper bottom, a weigh bin below the hopper receiving granular material dispensed from the hopper, means for sensing weight of granular material received in the weigh bin and a mix chamber below the weigh bin for collecting and mixing granular material dropped from the weigh bin after material weight has been sensed, the improvement comprising the means for sensing weight of granular material received in the weigh bin being a single means and being mounted outside of the frame on a vertically extending panel forming one side of the frame and extending the vertical height of the frame, the weight sensing means having a bracket projecting into space within the frame through an aperture in the vertically extending panel, the bracket supporting the weigh bin in cantilever fashion in the space within the frame, with the weigh bin being slidably horizontally moveable on the support bracket within the frame for removal from space within the frame.

46. A gravimetric blender including a vertically elongated frame, a plurality of granular material storage hoppers connected to the frame, valves for dispensing material from respective hoppers through orifices in the hopper bottoms, a weigh bin below the hoppers to receive granular material dispensed from the hoppers, a load cell for sensing weight of granular material received in the weigh bin and a mix chamber below the weigh bin for collecting and mixing granular material dropped from the bin after material weight has been sensed, the improvement comprising the frame being a single sheet of metal bent at ninety degree angles along two vertical lines to form three (3) vertically extending panel members, outer ones of the panel members being parallel and extending in a common direction from the central one of the panel members to define three sides of a rectangle with a fourth side remaining open to expose space within the frame for view of and access to the weigh bin and the mix chamber residing within that space, a transparent panel closing the open fourth rectangular side of the frame and being removably mounted on the frame to permit operator access to the weigh bin and mix chamber residing within the frame, the hoppers resting on supporting structure forming the top of the frame with the hoppers being manually removable by their being liftable from the frame without the use of tools, with the valves for dispensing granular material from the hoppers through openings in the bottoms of hoppers being fixedly connected to hoppers and removable therewith upon the associated hopper being lifted from the frame, the load cell for sensing weight of granular material received in the weigh bin being a single load cell mounted outside of the frame on the vertically extending panel forming one side of the frame and extending the vertical weight of the frame, the load cell having a bracket projecting into space within the frame through an aperture in the vertically extending panel, the bracket supporting a weigh bin in cantilever fashion in the space within the frame, with the weigh bin being slidably horizontally moveable on the support bracket within the frame for removal from the space within the frame.

47. In a gravimetric blender including a frame, at least one granular material storage hopper connected to said frame, means for dispensing granular material from said hopper through an orifice in the hopper bottom, a weigh bin having an aperture at the bottom thereof and being positioned below said hopper for receiving granular material dispensed from said hopper, said weigh bin having a dump flap pivotally movable between positions at which the dump flap covers said weigh bin bottom aperture and at which the aperture is open, means for sensing weight of granular material in said weigh bin, and a pneumatic piston-cylinder combination for opening said weigh bin after weight of granular material therein has been sensed for downward discharge of granular material therefrom to a mix chamber below said weigh bin for mixing granular material received from said weigh bin, the improvement comprising: said means for sensing weight of granular material received in said weigh bin being a single load cell mounted on the outside of said frame on a vertically extending panel forming one side of said frame and extending the vertical height of said frame, said load cell having a bracket projecting through an aperture in the vertically extending panel into space within said frame, said load cell being separated from said weigh bin and said mix chamber by the panel forming a portion of said frame, said panel being imperforate other than for the aperture through which said bracket extends, said bracket connecting said load cell and weigh bin, said bracket supporting said weigh bin in cantilever fashion in space within said frame with said weigh bin being slidably horizontally moveable on said bracket within said frame for removal from space within said frame, means for biasing the dump flap towards the position at which the dump flap covers said weigh bin bottom aperture, the pneumatic piston-cylinder combination for opening said weigh bin selectably contacting and moving said dump flap from the position covering the aperture to the position at which the aperture is open to release granular material in said weigh bin downwardly into said mix chamber and being spaced from said dump flap and weigh bin whenever the piston-cylinder combination is de-energized and said dump flap covers the aperture in the bottom of said weigh bin in response to force of a bias spring.

48. A gravimetric blender comprising:

a. a frame having a vertically extending transparent side;

b. a material storage hopper removably mounted on said frame and comprising means within said hopper for selectably downwardly dispensing material from said hopper;

c. a weigh bin, positioned inboard of said transparent side and enclosed by said frame below said hopper;

d. means connected to said frame for supporting said bin and sensing weight of said bin and material therein; and e. a mix chamber below said weigh bin including a material mixing agitator therewithin rotatable about a horizontal axis.

49. A gravimetric blender comprising:

a. a frame having three sides of unitary construction and a transparent side extending the vertical height of said frame;

b. a material storage hopper removably mounted on said frame and comprising valve means within said hopper for selectably downwardly dispensing material from said hopper;

c. a weigh bin, positioned inboard of and spaced from said transparent side supported by said frame below said hopper;

d. means connected to said frame for sensing weight of said bin and material therein;

e. a mix chamber below said weight bin and f. mixing means within said chamber movable angularly about an axis perpendicular to said transparent side.

50. A gravimetric blender comprising:

a. a housing;

b. a weigh bin mounted on said housing, having an aperture at the bottom thereof and comprising;

i. a movable weigh pan defining a portion of the bin bottom;

ii. a sloped section forming a portion of said bin bottom and extending downwardly from a bin side;

iii. remaining sides of said bin having co-planar lower extremities;

iv. at least a central part of said pan when said aperture is open being below said sloped portion;

c. means, connected to said housing, for sensing weight of material in said bin;

d. a mix chamber below said bin and connected to said housing including mixing means therewithin;

e. means for selectably moving said pan between a position covering said aperture at which said pan defines a portion of said bin bottom and an position at which said aperture is open for releasing material in said bin downwardly into said mix chamber.

51. A gravimetric blender comprising:

a. a vertically elongated frame having an open side and defining an enclosure for a weigh bin and a mix chamber;

b. a material storage hopper mounted on said frame;

c. said weigh bin connected to said frame below said hopper;

d. means, connected to said frame, for sensing weight of material in said bin as received from said hopper;

e. said mix chamber including rotatable mixing means therewithin being located below said bin and receiving material therefrom;

f. a vertically elongated panel adapted for fitting together with said frame to close said enclosure, said panel being transparent;

g. drive means supplying rotary motion for said mixer; and h. means for transferring rotary motion from said drive means to said mixer and operably disconnecting said mixer from said drive means upon disconnection of said panel from said frame.

* * * * *